United States Patent
Shah et al.

(10) Patent No.: US 11,534,766 B2
(45) Date of Patent: Dec. 27, 2022

(54) IMMUNO HISTO CHEMISTRY TISSUE PROCESSING SYSTEM

(71) Applicant: Rushabh Instruments, LLC, Ivyland, PA (US)

(72) Inventors: Preyas Shah, Furlong, PA (US); Sahil Shah, Furlong, PA (US)

(73) Assignee: Rushabh Instruments, LLC, Ivyland, PA (US)

( * ) Notice: Subject to any disclaimer, the term of this patent is extended or adjusted under 35 U.S.C. 154(b) by 181 days.

(21) Appl. No.: 16/562,605

(22) Filed: Sep. 6, 2019

(65) Prior Publication Data
US 2021/0069719 A1 Mar. 11, 2021

(51) Int. Cl.
B01L 9/00 (2006.01)
B01L 3/00 (2006.01)

(52) U.S. Cl.
CPC .......... B01L 9/52 (2013.01); B01L 3/502 (2013.01); *B01L 2200/025* (2013.01); *B01L 2200/026* (2013.01); *B01L 2200/04* (2013.01); *B01L 2200/082* (2013.01); *B01L 2200/087* (2013.01); *B01L 2200/143* (2013.01); *B01L 2200/16* (2013.01); *B01L 2200/18* (2013.01); *B01L 2300/021* (2013.01); *B01L 2300/069* (2013.01);
(Continued)

(58) Field of Classification Search
CPC ...... B01L 9/52; B01L 3/502; B01L 2200/025; B01L 2200/026; B01L 2200/04; B01L 2200/082; B01L 2200/087; B01L 2200/143; B01L 2200/16; B01L 2200/18; B01L 2300/021; B01L 2300/0609; B01L 2300/0627; B01L 2300/069; B01L 2300/0877; B01L 2400/0457; B01L 2400/0478
See application file for complete search history.

(56) References Cited

U.S. PATENT DOCUMENTS 5,047,211 A 9/1991 Sloane, Jr. et al.
8,158,061 B2 * 4/2012 Shah .............. G01N 1/312
422/65

(Continued)

OTHER PUBLICATIONS

Entire prosecution history of U.S. Appl. No. 15/237,768, filed Aug. 16, 2016, entitled "Immuno Histo Chemistry Tissue Processing System and Cartridge Therefor."
(Continued)

*Primary Examiner* — Samuel P Siefke
*Assistant Examiner* — Tingchen Shi
(74) *Attorney, Agent, or Firm* — RatnerPrestia

(57) ABSTRACT

A tissue processing system for processing a laboratory slide includes a slide holder for holding the slide, an outlet port positioned to direct a fluid stream onto the slide, and a device for moving the slide holder relative to the outlet port, or vice versa, to adjust a point on the slide at which the fluid stream is delivered onto the laboratory slide. The slide holder includes an absorbent pad configured to be positioned between one wall of the plurality of walls and a free edge of the slide for absorbing fluid travelling along the slide. A manifold of the system includes a first outlet port that directs a first fluid stream from a first fluid passageway onto the slide, and a second outlet port that directs a second fluid stream from a second fluid passageway onto a location of the slide that differs from the first fluid stream.

22 Claims, 21 Drawing Sheets

(52) U.S. Cl.
CPC .......... *B01L 2300/0609* (2013.01); *B01L 2300/0627* (2013.01); *B01L 2300/0822* (2013.01); *B01L 2300/0877* (2013.01); *B01L 2400/0457* (2013.01); *B01L 2400/0478* (2013.01)

(56) References Cited

U.S. PATENT DOCUMENTS

| | | | |
|---|---|---|---|
| 8,703,070 | B1 | 4/2014 | Parng et al. |
| 9,395,284 | B2* | 7/2016 | Favaloro ............... G01N 1/312 |
| 2003/0223796 | A1* | 12/2003 | Barth ................ B01J 19/0046 |
| | | | 400/124.01 |
| 2004/0062686 | A1* | 4/2004 | Ganz ................. B01J 19/0046 |
| | | | 422/504 |
| 2008/0102006 | A1* | 5/2008 | Kram ................ G01N 35/1065 |
| | | | 222/1 |
| 2009/0209752 | A1 | 8/2009 | Peters et al. |
| 2014/0065033 | A1* | 3/2014 | Bae ..................... G01N 21/75 |
| | | | 422/430 |
| 2015/0323776 | A1* | 11/2015 | Dyson-Holland ..... G01N 1/312 |
| | | | 348/79 |
| 2016/0282375 | A1* | 9/2016 | Barnett ................... G01N 1/44 |
| 2016/0368634 | A1* | 12/2016 | Lee ........................ A45D 34/00 |
| 2017/0058245 | A1* | 3/2017 | Shah .................. B01L 3/50273 |
| 2017/0266654 | A1 | 9/2017 | Sanroma et al. |
| 2020/0353467 | A1 | 11/2020 | Cappi et al. |

OTHER PUBLICATIONS

Non Final Office Action for U.S. Appl. No. 17/340,595, dated Sep. 29, 2022, 29 pages.

\* cited by examiner

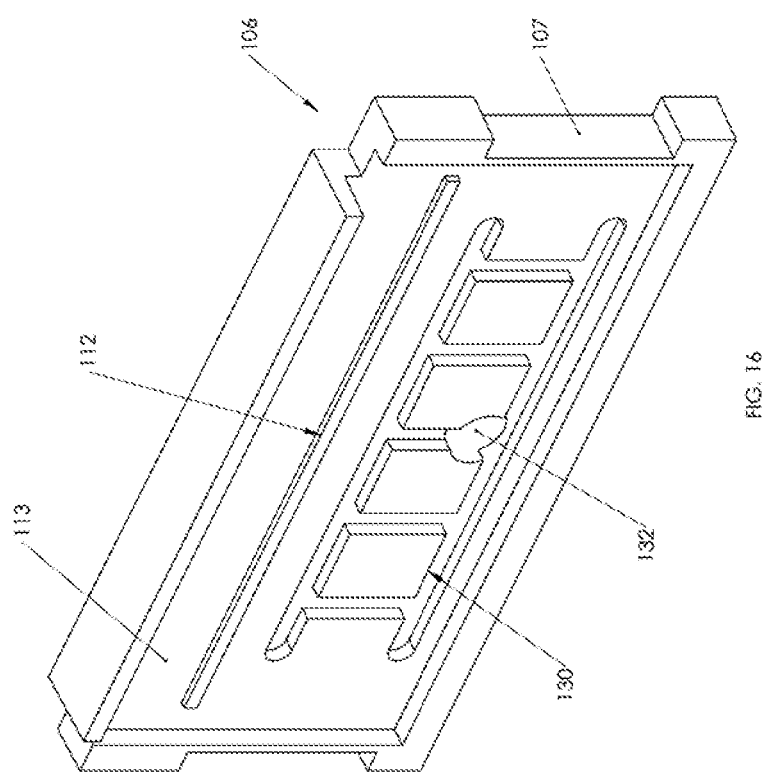

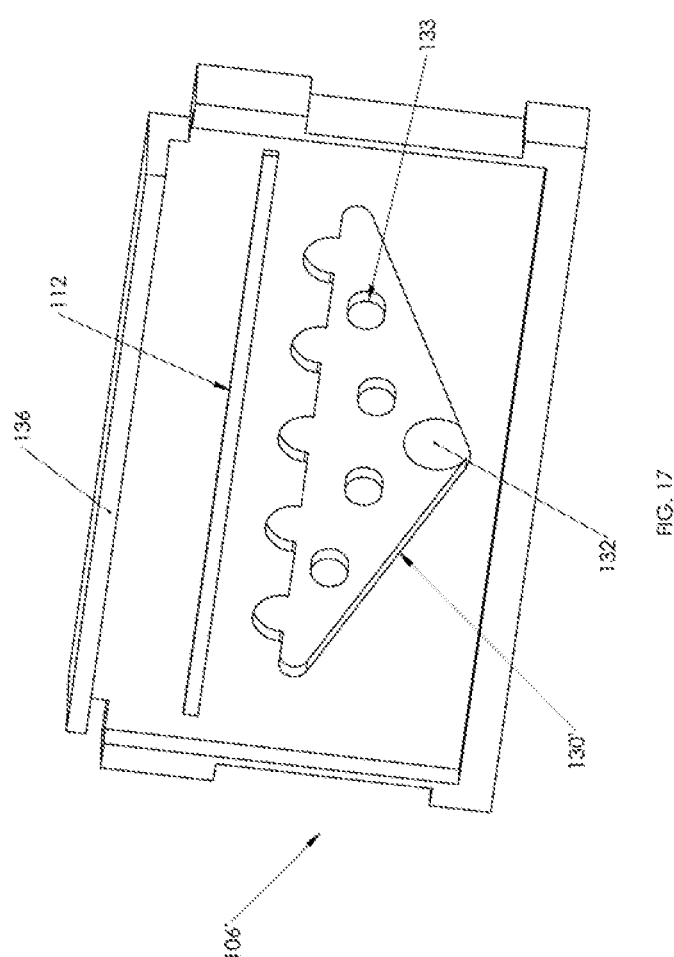

IMMUNO HISTO CHEMISTRY TISSUE PROCESSING SYSTEM

FIELD OF THE INVENTION

The present invention relates to an apparatus for processing tissue samples, and a slide holder as well as a reagent cartridge for use with the apparatus.

BACKGROUND OF THE INVENTION

Laboratories routinely stain biological tissue specimens deposited on laboratory slides for subsequent pathologic examination to detect and/or monitor tissue abnormalities. An immuno histo chemistry (IHC) tissue processing apparatus is used to process samples for immuno-histological reaction staining. Such an IHC tissue processing system is described in U.S. Patent App. Pub. No. 2017/0058245 to Rushabh Instruments Inc. (the '245 Publication, hereinafter), which is incorporated by reference herein in its entirety and for all purposes. An IHC tissue processing system may also be referred to in the art as a slide stainer.

Automated tissue processing systems allow processing of slides containing tissue specimens for subsequent examination. In the course of a process, the tissue specimens are exposed to a series of well-defined processing steps that ultimately produces a properly processed specimen for examination. Automation of the process significantly reduces the time required to process tissue specimens, reduces the incidence of human error, and allows processing parameters to be altered in an efficient manner. Improvements to tissue processing systems are continually sought in the interest of reliability, performance, speed and cost.

SUMMARY OF THE INVENTION

According to one aspect, a tissue processing system for processing a laboratory slide comprises a slide carriage for receiving the laboratory slide; an outlet port positioned to direct a fluid stream onto the laboratory slide; and means for moving the slide carriage relative to the outlet port, or vice versa, to adjust a point on the laboratory slide at which the fluid stream is delivered onto the laboratory slide.

According to another aspect, a slide holder assembly for holding a laboratory slide comprises a body having a plurality of walls. One of the walls includes an exit port disposed at an elevation beneath the slide and a channel formed on said one wall that is configured to transfer waste fluid from the slide to the exit port.

According to yet another aspect, a manifold of a tissue processing system for processing a laboratory slide comprises a body defining (i) a first fluid passageway for receiving a first fluid stream, (ii) a second fluid passageway for receiving a second fluid stream that is different from the first fluid stream, (iii) a first outlet port that directs the first fluid stream from the first fluid passageway onto the slide, and (iv) a second outlet port that directs the second fluid stream from the second fluid passageway onto a location of the slide that differs from the first fluid stream. The first and second fluid passageways are fluidly isolated from eachother.

According to still another aspect, a tissue processing system for processing a laboratory slide comprises a cartridge receiving area configured for releasably receiving a cartridge comprising individual wells, each well enclosing a fluid for processing the slide; means for moving the cartridge receiving area to align an outlet port of each individual well with the slide, or vice versa; and a reader for reading a code printed on the cartridge, the code containing processing instructions for the cartridge. The system is configured to dispense fluid from the outlet port of each well of the cartridge based upon the code printed on the cartridge.

BRIEF DESCRIPTION OF THE DRAWINGS

The invention is best understood from the following detailed description when read in connection with the accompanying drawings. It is emphasized that, according to common practice, the various features of the drawings are shown schematically and may not be to scale. Included in the drawings are the following figures:

FIG. 16 depicts an isometric view of a cover for the slide holder.

FIG. 17 depicts an alternative cover for the slide holder according to another embodiment.

DETAILED DESCRIPTION OF THE INVENTION

Figure 1:
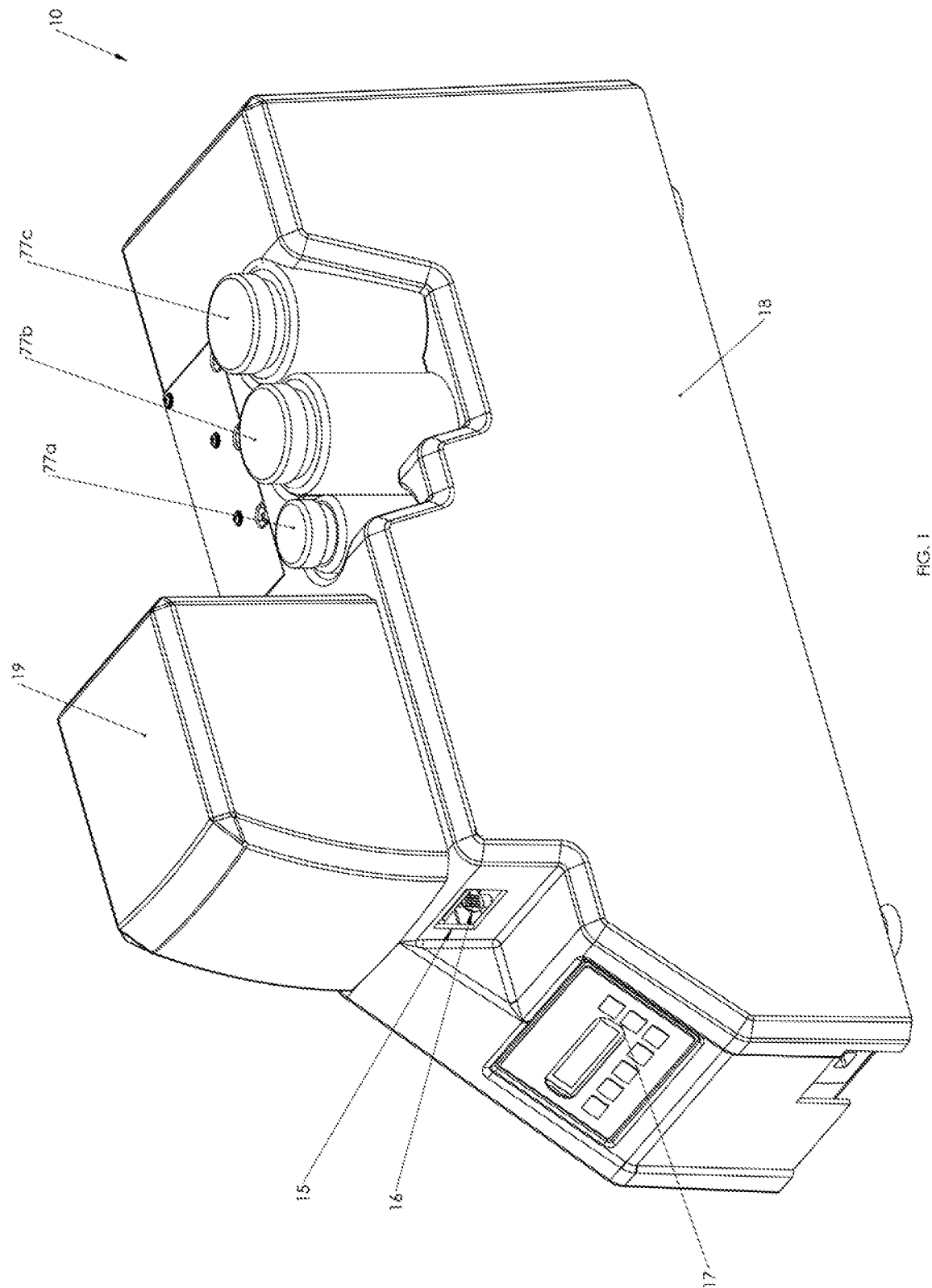
FIG. 1 depicts an isometric view of an IHC tissue processing system (system, hereinafter) as viewed from the top, front and right sides.

The invention will next be illustrated with reference to the figures. Such figures are intended to be illustrative rather than limiting and are included herewith to facilitate explanation of the present invention. In the drawing figures, like item numbers refer to like elements throughout. When a plurality of similar elements are present, a single reference numeral may be assigned to the plurality of similar elements with a letter designation referring to specific elements. When referring to the elements collectively or to a non-specific element, the letter designation may be omitted.

The drawing figures are not necessarily to scale and certain features of the invention may be shown exaggerated in scale or in somewhat schematic form in the interest of clarity and conciseness.

In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2:
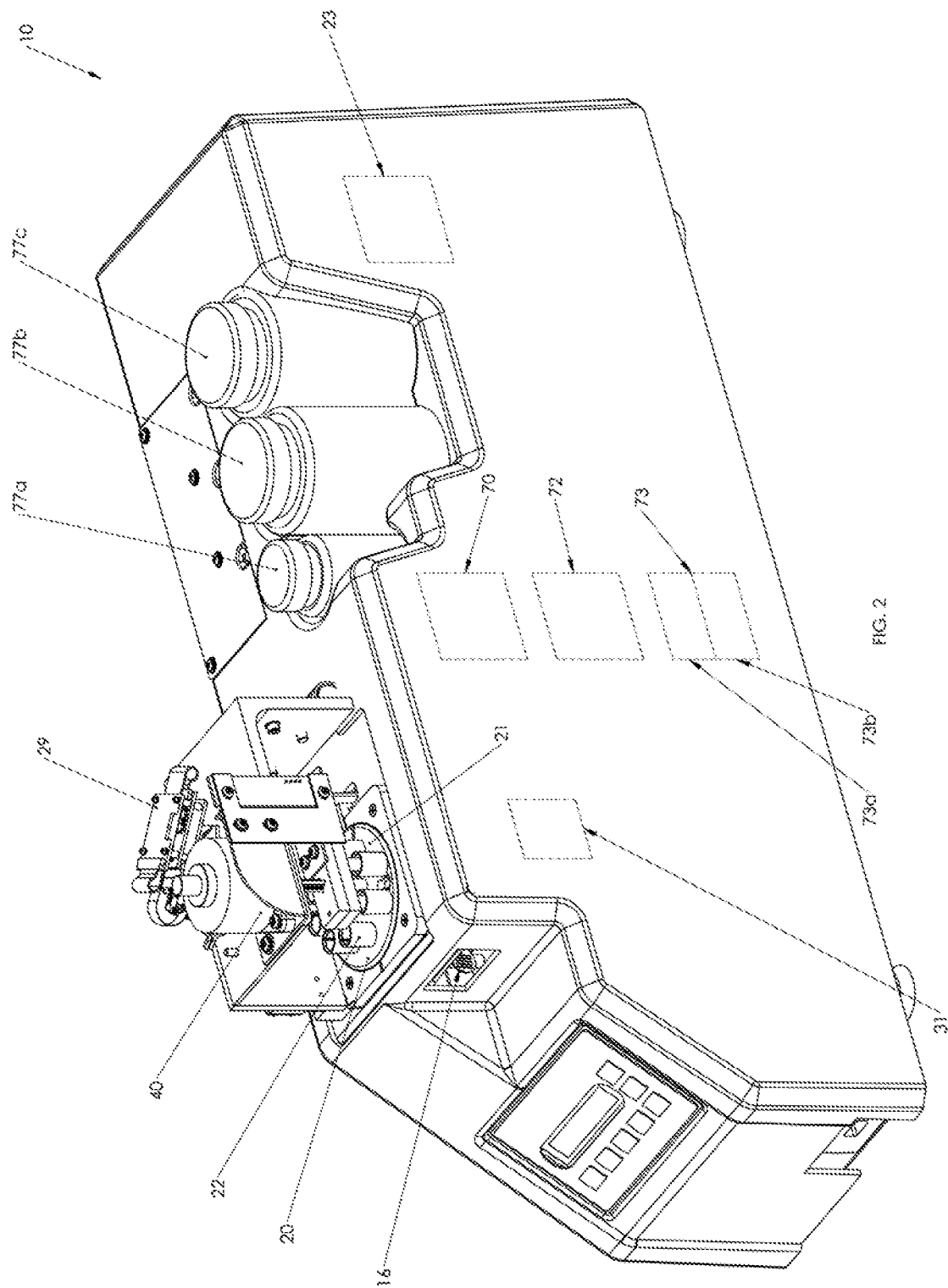
FIG. 2 depicts another isometric view of the system with a safety cover omitted to reveal further internal components of the system.
Figure 3:
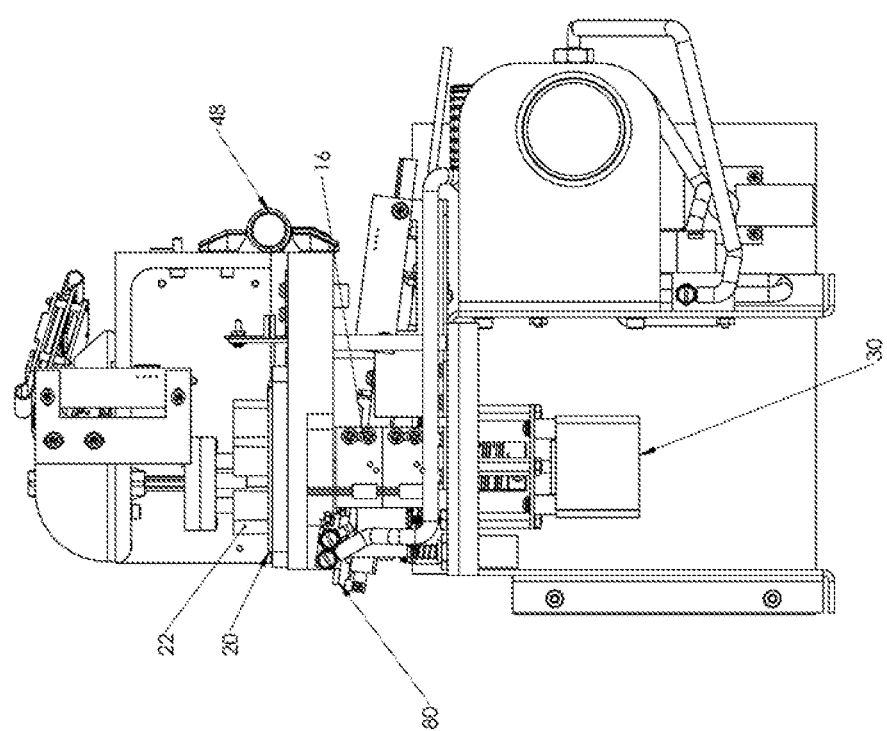
FIG. 3 depicts a right side elevation view of the system with various components omitted to reveal further internal components of the system.
Figure 14:
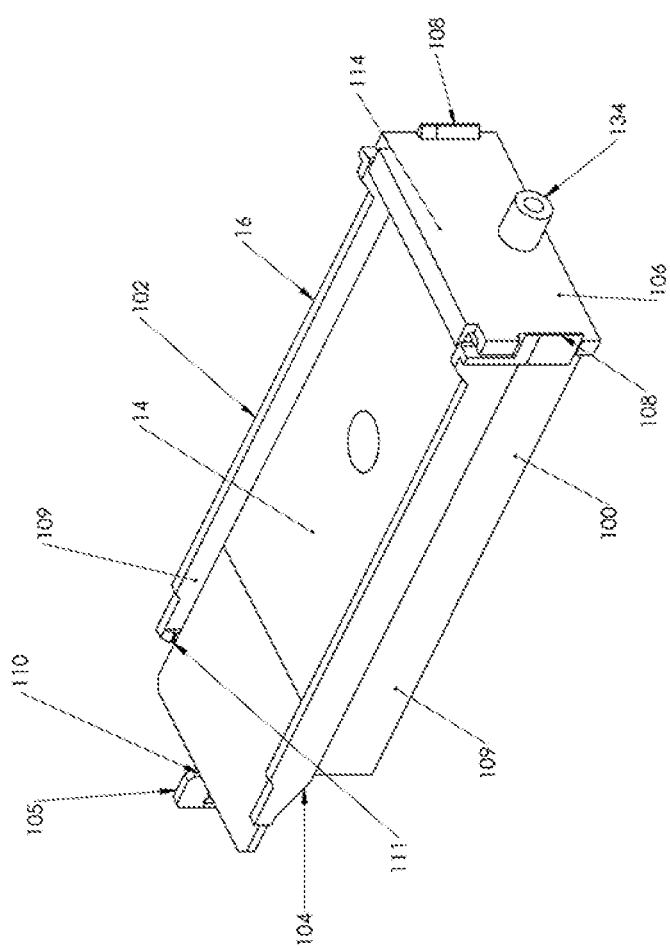
FIGS. 14 and 15 depict front and rear isometric views of a slide holder of the system.

FIGS. 1-3 depict an IHC tissue processing system 10 (referred to as system 10 hereinafter) for processing a laboratory slide 14. The slide 14 is mounted on a slide holder 16, as shown in FIG. 14. The system 10 is shown in various states of assembly in those figures. System 10 generally includes an enclosure 18 having an interior space for accommodating automated equipment for processing the slide 14. The enclosure 18 comprises various structural members upon which the automated equipment is mounted. A slide receiving slot 15 is provided on the front side of the enclosure 18 for releasably receiving the slide holder 16 and its slide.

A user interface 17 comprising a keypad, buttons and/or a display is disposed on the front side of the enclosure for receiving commands and information input by an end user or operator of the system 10. The user interface 17 is connected to an internal computer 23 including a processor and a controller for operating the system 10. The computer 23 is also electrically connected to the motors, RFID/barcode readers, pumps, compressors, heating element, solenoids and sensors, which are described herein, to send/receive signals to/from those components.

A movable safety cover 19 is hingedly mounted (or otherwise moveably mounted) to the top open end of enclosure 18 to provide selective access to the interior of system 10. Cover 19 prevents the operator from contacting any of the moving parts inside of system 10 during operation.

A cartridge 20 is removably loaded on the cartridge receiving area (i.e., the plate 35). The cartridge 20 comprises a cylindrical body 21 and fluid-containing wells 22 supported on the body 21. The surface of the cartridge 20 is indexed (e.g., includes mechanical locating features) so that the cartridge 20 can be installed on the cartridge receiving area in the correct rotational position.

A barcode or RFID label 27 (FIG. 8) is disposed on the top surface of the cartridge 20, and a barcode or RFID reader 29 is disposed on the system 10 for reading the barcode or RFID label 27 of the cartridge 20. The label 27 on the cartridge 20 contains information for processing of a slide, e.g., procedure type (e.g., melanoma analysis), sample type, processing times, temperature, protocols, expiration date etc. The system 10 may further include a barcode or RFID label disposed on the top surface of the slide 14, and a barcode or RFID reader 31 mounted in the enclosure 18 for reading the barcode or RFID label of the slide 14. The label on the slide 14 may contain information related to the slide 14, e.g., procedure type, sample type, patient data, processing times, temperature, protocols, etc. The computer 23 is configured to compare the information from the slide 14 and the cartridge 20 (based upon the information inputted from the labels) to determine whether the procedure type for the cartridge 20 matches the procedure type for the slide 14. The system 10 is further configured to alert an end user if the procedure types do not match, which may signify that an incorrect cartridge 20 was installed in the system 10.

Each fluid containing well 22 of the cartridge 20 comprises (i) a hollow cylinder, (ii) a puncturable membrane disposed at the bottom of the cylinder, (iii) a pin (not shown) having a sharp tip that is positioned in each cylinder for puncturing the membrane and enclosing the top end of the well 22 to prevent inadvertent escapement of the fluid, (iv) a fluid delivery channel positioned beneath each cylinder and in fluid communication with the membrane for receiving fluid from a punctured membrane, and (v) an exit port 24 (FIG. 7) disposed at the end of the fluid delivery channel and on the bottom surface of the cartridge 20 through which fluid is dispensed from the fluid delivery channel and onto the slide 14. Each exit port 24 is provided in the form of a nipple that extends from the lower end of the cartridge 20. Two of the fluid delivery channels are interconnected so that fluid streams can be mixed together and distributed at a single point onto the slide, as will be described in greater detail later. The fluid contained within each well 22 may be any type of known reagent, for example, although other fluids are envisioned. Further details of the cartridge are disclosed in the '245 Publication. It is also noted that the cartridge 20 may vary from that which is shown and described and is not limited to the embodiment shown herein.

Figure 7:
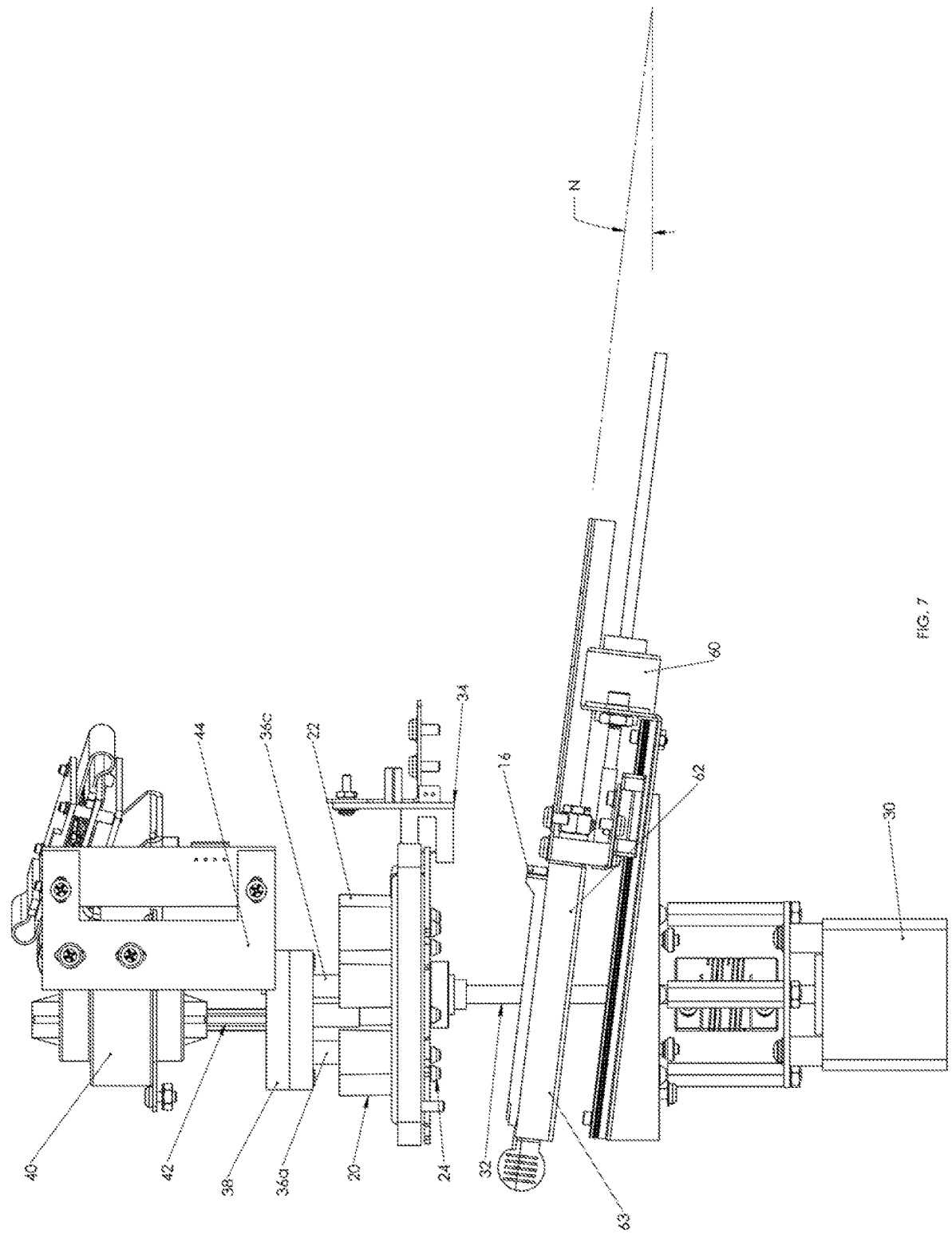
FIG. 7 depicts another right side elevation view of the system with various components omitted to reveal further internal components of the system.

Turning now to FIG. 7, a motor 30 is connected to a shaft 32 for rotating (or otherwise moving) the cartridge 20 to a desired rotational position. The shaft 32 rotates about its own longitudinal axis. The shaft 32 rotates a rotatable plate 35 that is mounted and keyed to the shaft 32. The plate 35 is positioned adjacent a top facing surface of the enclosure 18. The plate 35 may also be referred to herein as a cartridge receiving area. It should be understood that rotation of an output shaft of the motor 30 causes rotation of the plate 35.

The cartridge 20 is positioned on and keyed to the plate 35, such that the cartridge 20 rotates along with the plate 35. The exit ports 24 of the cartridge 20, which protrude from the bottom surface of the cartridge 20, are positioned through corresponding holes in the plate 35, such that the cartridge 20 can only be mounted on the plate 35 in a single rotational orientation. The motor 30 rotates the plate 35 and the cartridge 20 such that (only) one exit port 24 of the cartridge 20 is positioned at the appropriate location over the slide 14, and that one or more wells 22 are aligned with one or more pistons 36 extending from a translating piston carriage 38, which will be described hereinafter. Also, a sensor 34 detects the rotational position of the cartridge 20 by sensing mechanical cutouts 37 or other locating features on the perimeter of the plate 35. The sensor 34 is (optionally) an optical gap sensor that, combined with the computer and rotation of the cartridge 20 by the motor 30, effectively as a rotary encoder for positioning the correct exit port 24 over the slide 14.

Although it has been described that the motor 30 moves the cartridge 20 with respect to the slide 14, it should be understood that another motor (such as motor 60) may be used to move the slide 14 with respect to the cartridge 20 to achieve a similar result. Alternatively, the motor 30 may be omitted in favor of moving the position of the cartridge 20 in a manual fashion.

Figure 5:
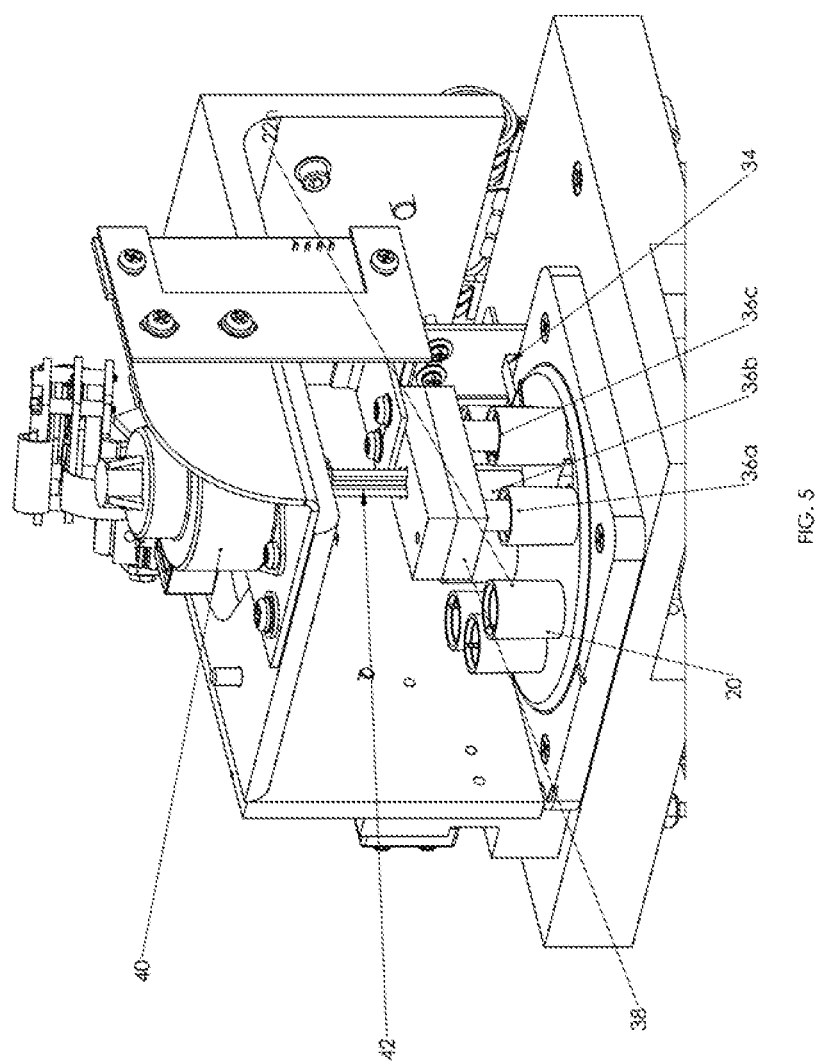
FIG. 5 depicts a detailed isometric view of the system as viewed from the top, front and right sides with various components omitted to reveal further internal components of the system.
Figure 6:
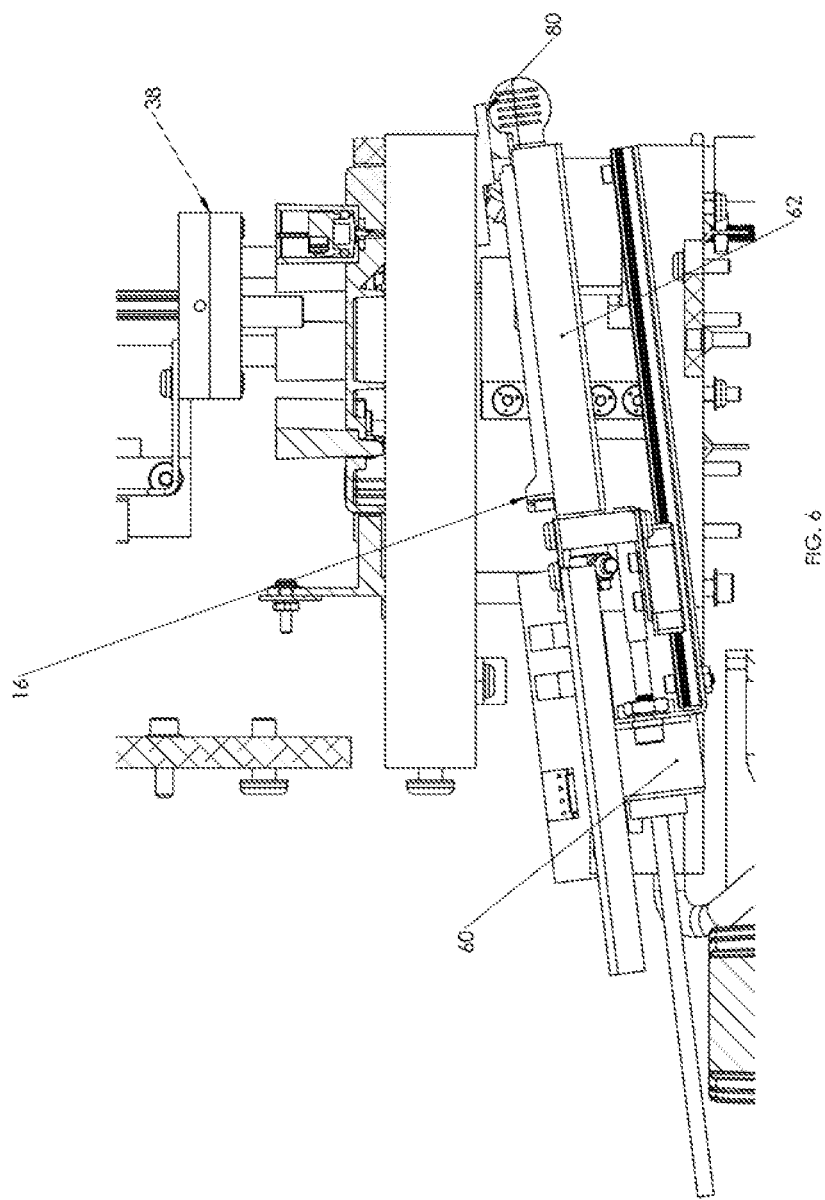
FIG. 6 depicts another detailed left side elevation view of the system with various components omitted to reveal further internal components of the system.

Turning now to FIGS. 5 and 7, a motor 40 having a translatable output shaft 42 is connected to the translating piston carriage 38. A sensor 44 monitors the translational position of the piston carriage 38. The carriage 38 and the motor 40 are indirectly (or directly) connected to the cover 19 and move therewith. Three pistons 36a-c (referred to either individually or collectively as piston(s) 36) extend from the bottom side of the piston carriage 38. It should be understood that the pistons 36 do not translate with respect to the piston carriage 38, i.e., the pistons 36 move with the piston carriage 38. Also, the pistons 36 do not rotate. The pistons 36 are solid cylindrical bodies having an outer diameter that is less than the inner diameter of the wells 22 so that the pistons 36 can travel within the interior of wells 22. A transmission (not shown) converts rotational motion of an output shaft of the motor 40 to translation of the shaft 42.

In use, the motor 40 is controlled to translate the piston carriage 38 either upward or downward (i.e., in a direction along the axis of the shaft 42). As noted above, the motor 30 is controlled to rotate the cartridge 20 so that the well 22 are rotationally aligned with one or more pistons 36a-c. Once the well(s) 22 are rotationally aligned with one or more pistons 36a-c, the motor 40 is controlled to translate the pistons 36a-c so that the pistons 36a-36c travel downwardly through the well(s) 22. The pistons 36a-c move one or more pins in the wells 22 downwardly, which causes the sharp tip of the pin(s) to puncture the membrane(s) of the wells and deliver fluid through the punctured membrane(s), into the fluid delivery channel(s), through one of the exit ports 24 and onto the slide 14.

Figure 8:
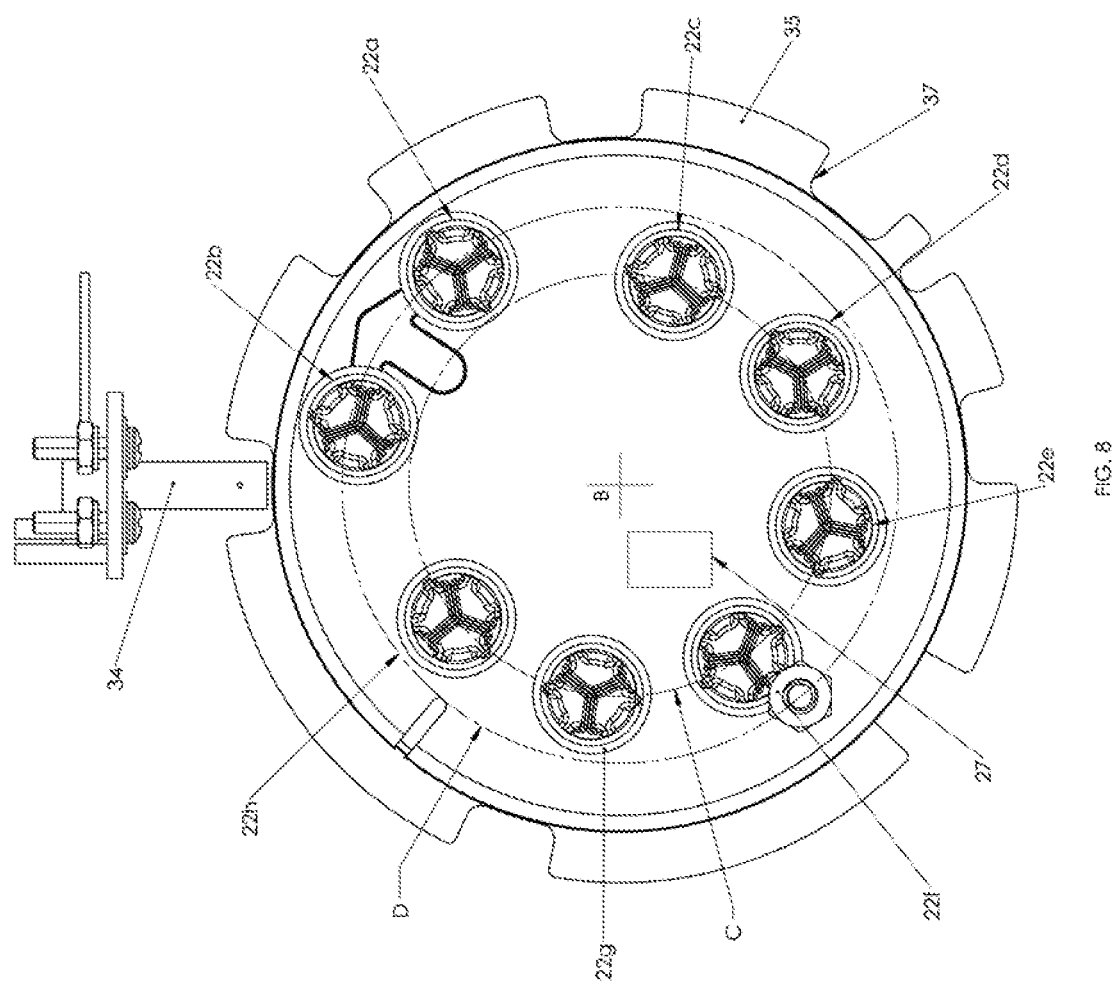
FIG. 8 is a top plan view of a segment of the system depicting a cartridge.

Turning now to FIG. 8, as noted above, the pistons 36a-c move either one or two pins in the wells 22 during operation. More particularly, the pistons 36a-c move either one or two pins in the wells 22 depending upon the rotational position of the wells 22 of the cartridge 20 with respect to the pistons 36a-c. The wells 22 are arranged about the axis of rotation B. Two imaginary circles C and D are arranged coaxially about the axis B. Imaginary circle C has a smaller diameter than circle D. Two adjacent wells 22a and 22b are arranged along the perimeter of the circle D, whereas the remaining wells 22c-22h are arranged along the perimeter of the circle C. The adjacent wells 22 are spaced apart by predetermined gaps. The pistons 36a and 36c are arranged about and aligned on outer circle D, whereas piston 36b is arranged and aligned on inner circle C.

Turning now to FIG. 5, in a single dispense configuration of the cartridge 20, the cartridge 20 is rotationally positioned such that the central piston 36b is positioned to interact one of the wells 22c-22h (22h in this example). Stated differently, in the single dispense configuration, the cartridge 20 is rotationally positioned such that the central piston 36b is aligned with one of the wells 22c-22h so as to register with that well 22. In the single dispense configuration, the outer pistons 36a and 36c are positioned adjacent said one of said wells 22c-22h (22h in this example), and the outer pistons 36a and 36c cannot be positioned with any of the wells 22. Accordingly, translation of the piston carriage 38 causes the dispensation of fluid from (only) the well 22h. It should be understood that when the piston 36b is positioned within any of the wells 22c-22h, the outer pistons 36a and 36c are not positioned within any of the wells 22.

Figure 9:
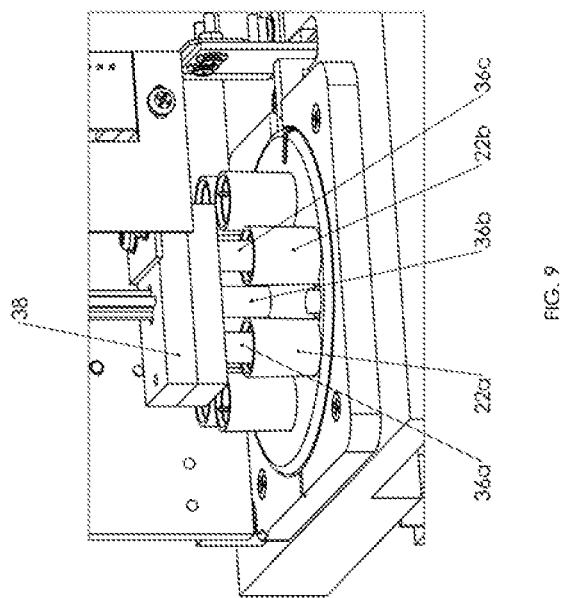
FIG. 9 depicts another isometric view of the system like FIG. 5, with the exception that FIG. 9 shows two of the pistons interacting with two fluid wells of the cartridge.

Turning now to FIG. 9, in a dual dispense configuration of the cartridge 20, the cartridge 20 is rotationally positioned such that the outer pistons 36a and 36c are positioned to interact with the wells 22a and 22b, respectively, while the central piston 36b is positioned between the wells 22a and 22b. The central piston 36b is not positioned within any of the wells 22 in a dual dispense configuration.

Figure 4:
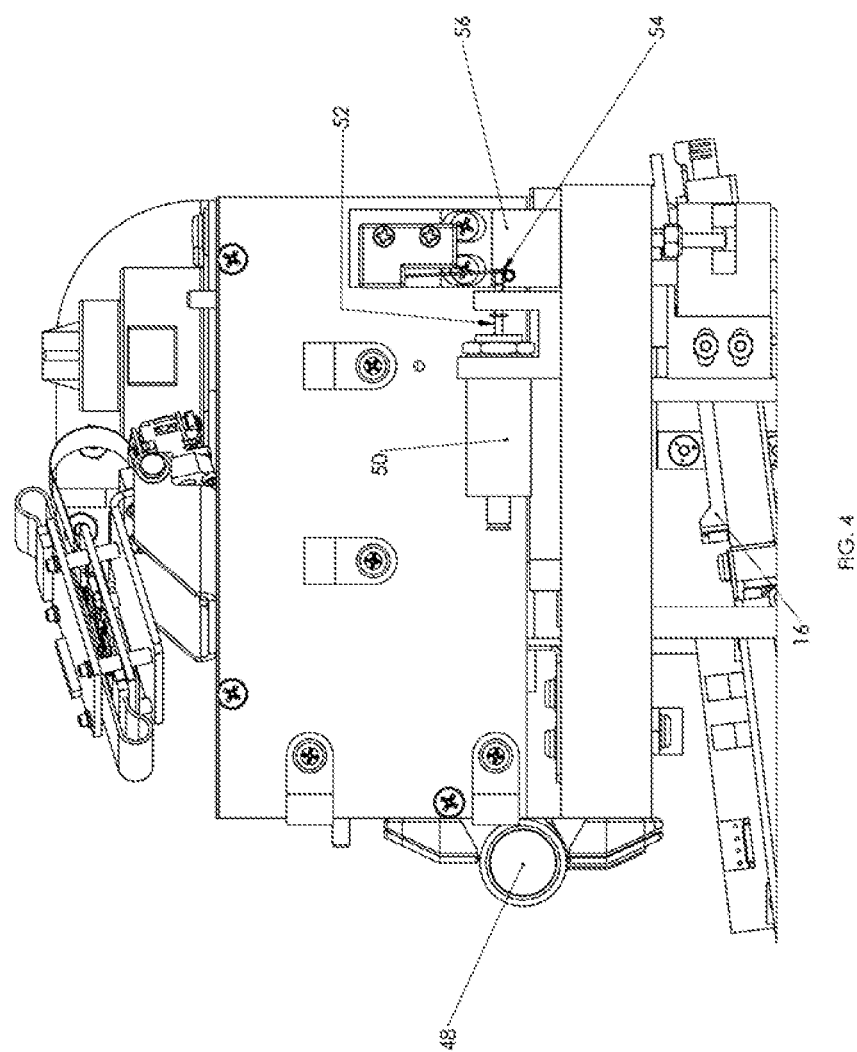
FIG. 4 depicts a detailed left side elevation view of the system with various components omitted to reveal further internal components of the system.

Turning now to FIGS. 1 and 4, the cover 19 is hingedly mounted to the top end of the enclosure 18 by a hinge 48. In use, the cover 19 is opened so that the end user can replace the one-time use cartridge 20. To secure the cover 19 in a closed position during operation, the system 10 includes a solenoid 50 for latching the cover 19 in the closed position. The solenoid 50 is mounted to the base enclosure 18 (and not the cover 19). The solenoid 50 includes a retractable pin 52 that engages with an opening 54 on the cover 19. In the closed state of the cover 19, the pin 52 resides within the opening 54 to retain the cover 19 in a closed state. It is noted that the pin 52 and opening 54 are positioned on the opposite side of the cover 19 as compared with the hinge 48. Stated differently, the pin 52 and opening 54 are positioned on the front side of the cover 19, and the hinge 48 is disposed on the rear side of the cover 19.

A microswitch 56 senses when the pin 52 is engaged with the opening 54. If the end user attempts to operate the system 10 without closing the cover 19, the system 10 would alert the end user that operation cannot be initiated until the cover 19 is latched closed by the solenoid pin 52, as sensed by the microswitch 56. The microswitch 56 may be any type of switch or position sensor.

In the absence of the solenoid 50, the cover 19 could inadvertently open upon depressing the piston carriage 38 if the force required to move the cover 19 is less than the force required to translate the pin(s) within the wells 22. This could occur because the piston carriage 38 is connected to the cover 19, and not the enclosure 18. Those skilled in the art will recognize that the piston carriage 38 could also be connected to the enclosure 18.

Figure 10:
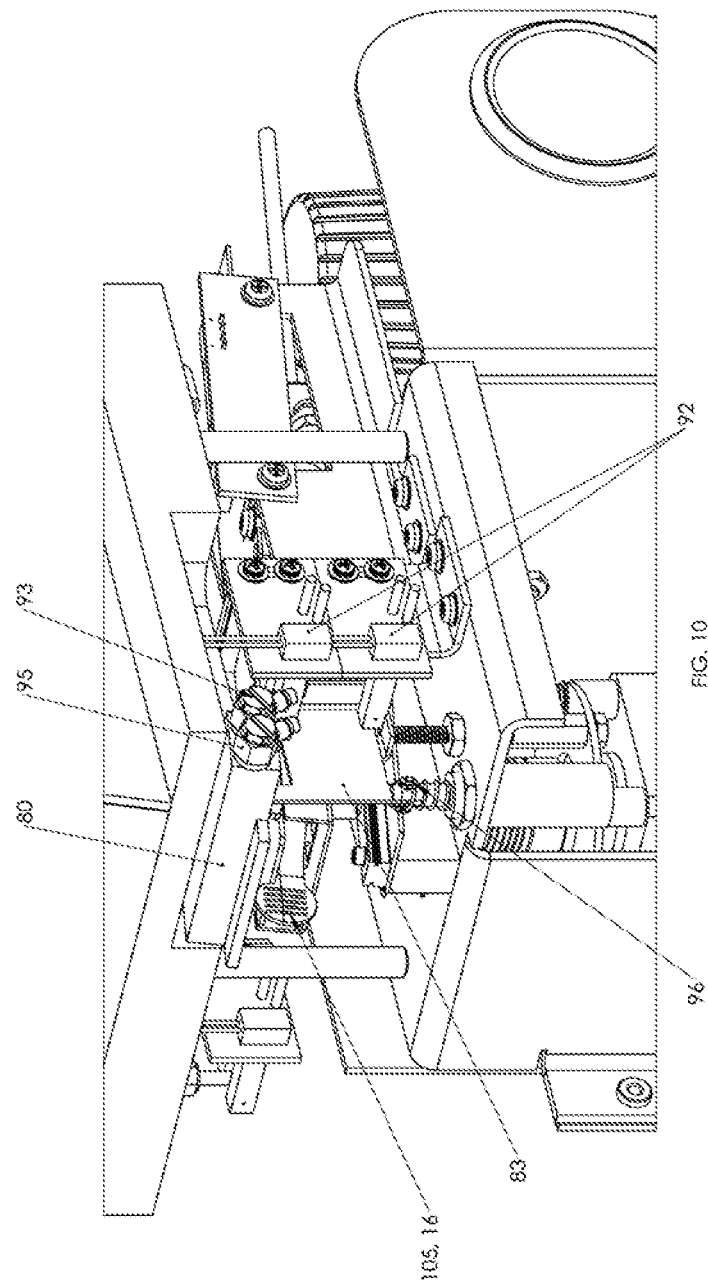
FIG. 10 is another detailed isometric view of the system as viewed from the top, front and right sides with various components omitted to reveal further internal components of the system.
Figure 11:
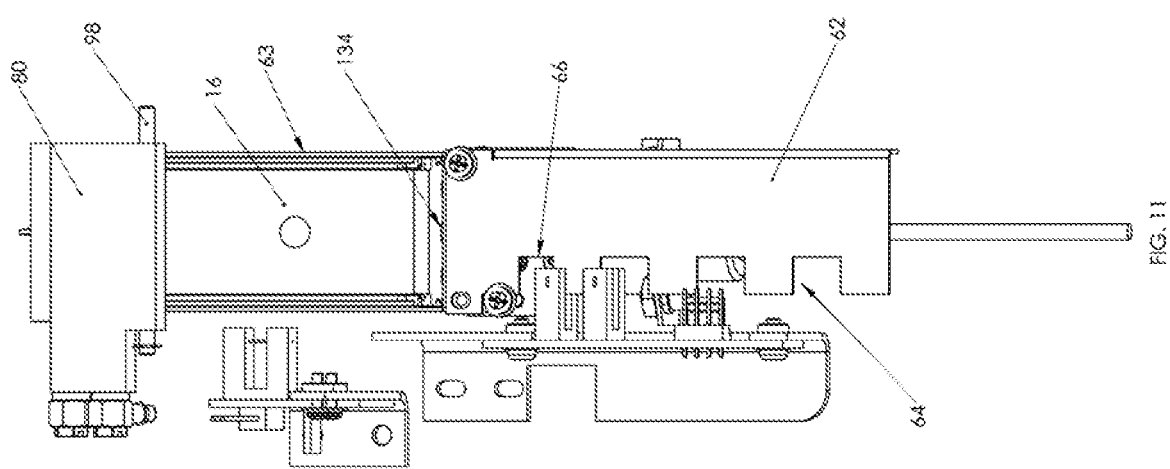
FIG. 11 depicts a top plan view of a slide carriage and other components of the system.

Turning now to FIGS. 7, 10 and 11, as mentioned above, the exit ports 24 of the cartridge 20 are movable to a location over the slide 14 for distributing fluid onto the slide 14. It should be understood that when one exit port 24 (i.e., the active exit port 24) is positioned over the slide 14 for distributing fluid onto the slide 14, the remaining exit ports 24 are not registered with the slide 14, and, therefore, the remaining exit ports 24 are not operated at that time to expel fluid.

As best shown in FIG. 7, the slide holder 16 and the slide 14 are tilted by an angle 'N', which may be 0-10 degrees, or, more preferably 4-5 degrees. The slide 14 is tilted to promote run-off and removal of the various liquids (especially the reagent fluid) that are distributed onto the slide 14. The buffer solution removes a significant proportion of the reagent from the tissue, and the compressed air helps guide residual liquid to the absorbent pad 120 (described later). However, when small volumes of liquid, like the reagent are dispensed, tilting of the slide 14 causes the reagent to travel very slowly towards the bottom of the slide 14 by gravity, giving the reagent enough time to interact with the tissue before rolling down further. Equally important, slight tilting of the slide 14 prevents reagent from migrating back up the tilted slide 14. The inadvertent migration problem was encountered early in the product development phase when the reagent migrated higher up the slide 14 than the compressed air or buffer solution could reach, and the residual reagent inadvertently interacted with the next processing reagent. For this reason, the slide 14 is now tilted and an absorbent pad 120 is incorporated into the slide holder 16. As will be described in detail later, the absorbent pad 120 (FIG. 15) absorbs the liquid on the slide and, thus, ensures that liquid does not remain on the slide 14 due to surface tension of the liquid remaining at the lower most end of the slide 14. If the slide were not tilted, then the compressed air alone would still direct liquid to the absorbent pad 120.

The slide holder 16 is capable of moving with respect to the active exit port 24 to control the exact location that the fluid distributed from the active exit port 24 of the cartridge 20 is expelled onto the slide 14. A user can set the preferred location of fluid contact on the slide 14 (e.g., rear, front or center of slide) using the interface 17, for example. To accomplish this movement of the slide 14, the system 10 includes a linear actuator 60 for moving a slide carriage 62, to which the slide holder 16 is attached, backward and forwards with respect to the active exit port 24.

Turning now to FIGS. 7 and 11, the slide carriage 62 comprises a carriage body 63 for releasably receiving the slide holder 16, and a sheet metal plate having cutouts 64 extending from the carriage body 63. The carriage body 63 includes a waste collection port that is fluidly connected to a connector 134 of the slide holder 16, which will be described later. The slide carriage 62 is non-removably mounted to the enclosure 18, such that the slide carriage 62 remains connected to the enclosure 18 upon removing the slide holder 16 from the enclosure 18.

The linear actuator 60 comprises a motor that rotates a rod, which translates a nut that is attached to the slide carriage 62. The linear actuator 60 may vary from that which is shown and described, and could be another type of actuator, a motor, or a solenoid, for example. The linear actuator 60 is configured to move the carriage 62, and the holder 16 moves along with the carriage 62. A stationary optical sensor 66 (FIG. 11) is mounted to the enclosure 18, and senses the individual cutouts 64 as the carriage 62 moves backwards and forwards. Based upon the unique identifier of each cutout 64, the computer of the system 10 can determine the positional location of the slide holder 16 (and its slide 14) with respect to the active exit port 24 of the cartridge 20. If, for example, the end user instructs the system 10 to expel fluid onto the front end of the slide 14, the motor 60 will move the carriage 62, along with the holder 16 mounted thereto, to a position where the sensor 66 senses the cutout 64 corresponding to a position where fluid would be expelled onto the front end of the slide 14.

Turning now to FIGS. 2 and 10-12, during processing of the slide 14, a rinse solution (such as a buffer solution) is selectively distributed over the slide 14. The rinse solution is stored within a container 77c (FIG. 2) that is stowed within the system 10. A peristaltic pump 70 (FIG. 2) is mounted within the enclosure 18 and is used to transport the solution from the rinse solution container 77c, through a conduit (not shown), into a manifold 80, and onto the slide 14. Compressed air is also selectively delivered over the slide 14 during processing of the slide 14. A compressor pump 72 (FIG. 2) mounted within the enclosure 18 is used to deliver air through a conduit (not shown), into the manifold 80, and onto the slide 14.

Figure 12:
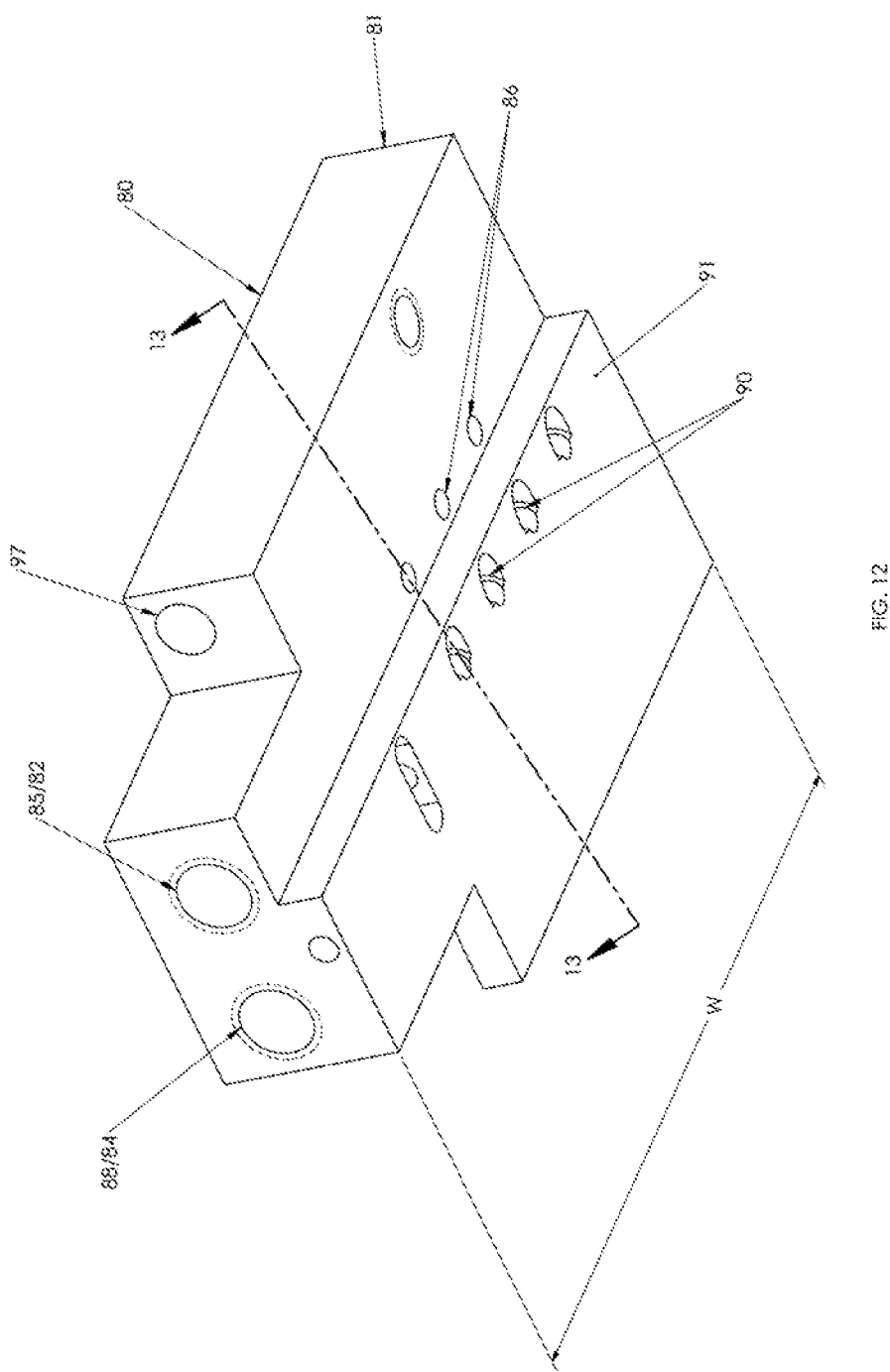
FIG. 12 depicts an isometric view of a manifold of the system.
Figure 13:
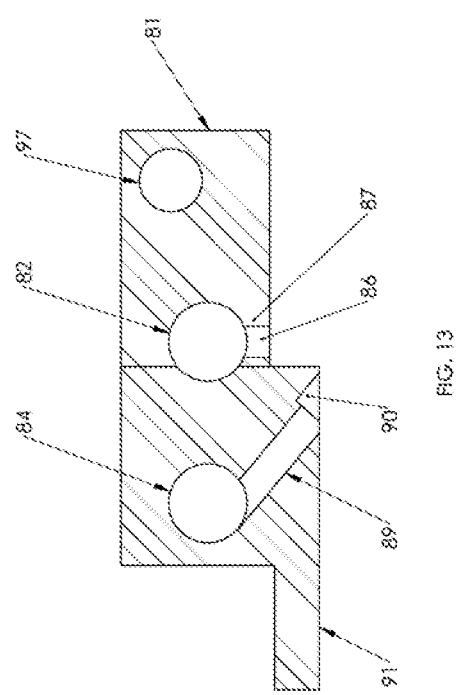
FIG. 13 depicts a cross-sectional view of the manifold of FIG. 12 taken along the lines 13-13.

Turning now to FIGS. 12 and 13, the details of the manifold 80 will be described. The manifold 80 handles two discrete fluid streams (e.g., air and a rinse solution) without mixing those streams. More particularly, the manifold 80 comprises a body 81 having a first fluid passageway 82 for transporting the solution, a second fluid passageway 84 for transporting the compressed air, and an opening 97 for receiving a shaft 98 (FIG. 11). The compressed air forms an air curtain that propels waste liquid residing on the slide 14 toward the absorbent pad 120 (FIG. 15) as the slide 14 is translated by the system 10.

The first fluid passageway 82 comprises a single inlet port 85 disposed on a side surface of the body 81 for receiving the solution from the pump 70 via a conduit (not shown), and a series of outlet ports 86 (three shown) for evenly distributing the solution over the width of the slide 14. The outlets 86 are spaced apart along the width 'W' of the body 81. The passageways 87 leading to the outlets 86 may be straight vertical channels as shown in FIG. 13, or they could be angled, like passageways 89. It should be understood that the inlet 85 is in fluid communication with all of the outlets 86.

The second fluid passageway 84 comprises a single inlet 88 disposed on the same side surface of the body 81 as inlet 85 for receiving the compressed air from the pump 72 via a conduit (not shown), and a series of outlet ports 90 (four shown) for evenly distributing the air over the width of the slide 14. The passageways 89, each of which leads to one of the outlet ports 90, as well as the outlet ports 90 themselves, are oriented at an acute angle with respect to the bottom surface 91 of the body 81. The axes of the outlet ports 90 are parallel to each other. The outlet ports 90 are spaced apart along the width 'W' of the body 81. The outlet ports 90 are counterbored holes, which help to keep the air stream moving against the slide 14. The outlet ports 90 could be countersunk, if so desired. It should be understood that the inlet 88 is in fluid communication with all of the outlets 90. The fluid type (i.e., air), height of dispense, speed and pressure of dispense, and rate of dispense determine the orifice size, number, and spacing of the outlet ports 90. It is noted that the fluid passageway 84 and the outlet ports 90 could also transport rinsing fluid, if so desired.

Figure 15:
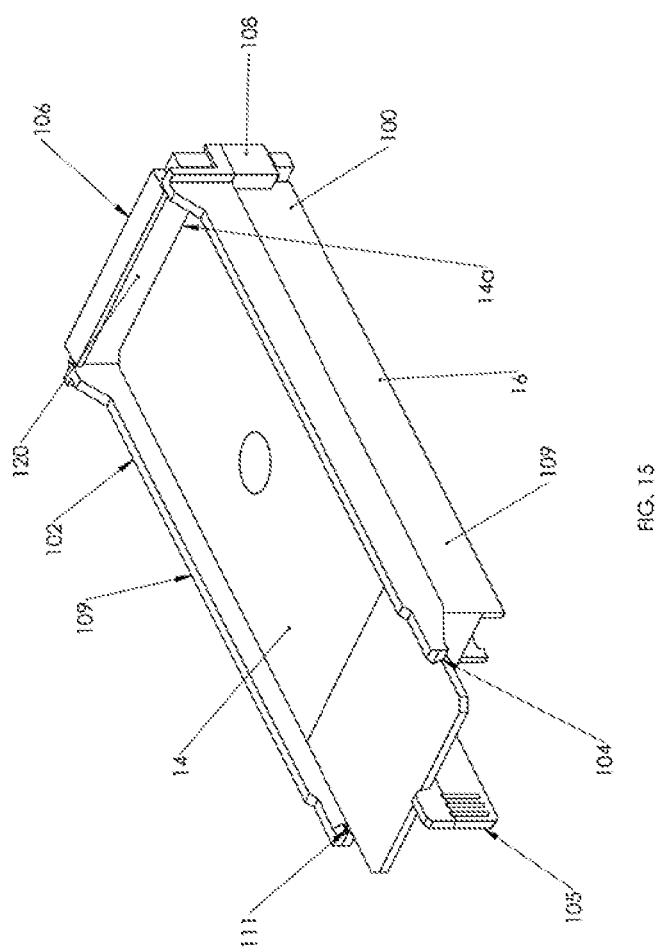
Figure 19:
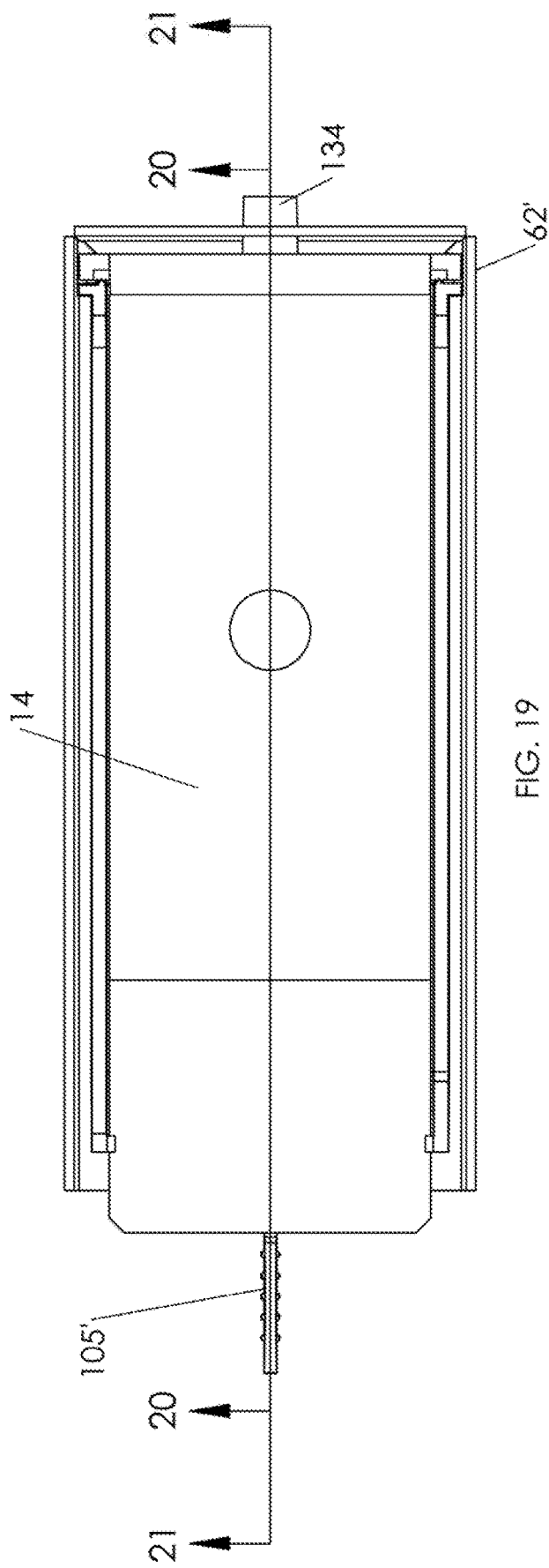
FIG. 19 depicts a top plan view of the sub-assembly of FIG. 18.

The outlet ports 86 for the rinse solution are positioned closer toward the center of the slide 14 than the outlet ports 90 for the compressed air. By virtue of that arrangement, the compressed air can direct air across the entire length of the slide, and thereby direct all of the used rinse solution residing on the slide 14 toward the absorbent pad 120 (FIG. 15). The fluid type (i.e., liquid), height of dispense, speed and pressure of dispense, and rate of dispense determine the orifice size, number, and spacing of the outlet ports 86. It is noted that the fluid passageway 82 and the outlet ports 86 could also transport air, if so desired.

The body 81 may be machined, cast and/or molded. The body 81 may comprise one unitary component, as shown, or may comprise a plurality of components that are mounted together. For example, the fluid passageway 82 may be defined in a different manifold than fluid passageway 84.

As best shown in FIG. 10, fluid connectors 93 and 95 are shown connected to the inlet ports 85 and 88, respectively, of the manifold 80. The fluid connectors 93 and 95 are connected to separate conduits (not shown) and receive fluid therefrom.

The manifold 80 is held tightly against the slide holder 16 during operation of the system 10 in order to maintain the proper orientation of air delivery over the slide 14. Alternatively, there may be a slight gap between the manifold 80 and the slide holder 16. Nevertheless, a gap exists between the manifold 80 and the slide 14 to prevent damage to the tissue sample, and ensure that the fluid or air dispensed from the manifold 80 covers the entire width of the slide 14.

The manifold 80 is biased against the slide holder 16 by a solenoid 96. The manifold 80 is capable of moving (e.g., rotating) to enable the insertion or removal of the slide holder 16 to/from the receiving slot 15 (FIG. 1) of the system 10. The manifold 80 can rotate about the shaft 98 (FIG. 11), which is mounted to a fixed point on the enclosure 18. More particularly, a flag 83, which may be a sheet metal component, is mounted to the movable shaft of the solenoid 96 and the manifold 80. The flag 83 translates along with the shaft of the solenoid 96. A pair of optical gap sensors 92 track movement of the flag 83 (or the manifold 80) to determine the position of the manifold (i.e., either against or away from the slide holder 16).

In use, the solenoid 96 is operated to rotate the manifold 80 upwards about the shaft 98 in order to permit the entrance/exit of the slide holder 16 through the receiving slot 15 (FIG. 1) of the system 10. Once the slide holder 16 is positioned within the receiving slot 15, the solenoid 96 biases the manifold 80 downward against the slide holder 16 to ensure that the manifold 80 is properly positioned relative to the slide 14 during dispense of liquid or compressed air. The pair of optical gap sensors 92 ensure that the manifold 80 is in close proximity to the slide holder 16. When not in operation, the manifold 80 is returned back to its initial position (i.e., to a position away from the slide holder 16) in order to ensure that the raised rear cover 106 of the slide holder 16 does not interfere with the manifold 80 upon inserting the slide holder 16 through the slot 15. As an alternative to the movable manifold 80, the manifold 80 may be stationary and immovable.

Turning now to FIGS. 14-16, the slide holder 16 comprises a rectangular drawer-like body 100 having an open top side 102, a front side 104, a rear side cover 106, a bottom side, and two longitudinal sides 109. A rectangular handle 105 extends forwardly from the front side 104 of the slide holder 16. The handle 105 is configured to be grasped by an operator of the system 10. The rear side cover 106 is snapped fitted onto prongs 108 extending from the longitudinal sides 109 of the body 100. The rear cover 106 extends to an elevation above the sides 109 to prevent the liquid residing on the slide 14 from escaping the slide holder 16, especially because the slide 14 is tilted and compressed air is applied to the top surface of the slide 14. The rear cover 106 may be a separate component, as shown, or it may be unitized with the body 100. The rear cover 106 could also be connected to the body 100 by a living hinge, for example.

The rear cover 106 is a rectangular body having slots 107 on its height-wise sides for receiving the prongs 108 of the body 100. The front facing side 113 of the cover 106 includes a rectangular protruding shelf 112 that extends along the width of the cover 106. A channel system 130 comprising indents is disposed on the front facing side 113, extends across the width of the cover 106, and is positioned at an elevation beneath the shelf 112. An outlet 132 is a through-hole formed in the width-wise center of the cover 106 and at the base of the channel system 130. Liquid accumulates near the outlet 132 at a location between the bottom of the slide 14 and the bottom side of the slide holder 16.

The outlet 132 extends to and is fluidly connected with a hollow connector 134 that protrudes from the rear facing side 114 of the cover 106. The connector 134 is removably connected to a waste collection point on the slide carriage 62. The waste collection point on the slide carriage 62 is connected to a conduit (not shown). The conduit is also connected to a waste pump system 73 (FIG. 2). The waste pump system 73 removes the waste fluid from the slide holder 16 (via the conduit, waste collection point on carriage 62, and outlet 132 on the slide holder 16) and delivers the waste fluid to one of two waste reservoirs 77a and 77b (FIG. 2) stowed in the enclosure 18, as will be described later.

In the embodiment shown in FIG. 16, the channel system 130 is constituted by indents formed in the side 113 and the indents have a sideways ladder shape, however, the channel system 130 may take any shape that is configured to direct the waste fluid to the outlet 132. For example, in FIG. 17, the channel system 130' of the rear cover 106' is constituted by a triangular shaped indent formed in the side 113, with the lowermost point of the triangle leading to the outlet 132. A series of cylindrical protrusions 133 extend in a forward direction from the triangular shaped indent. The protrusions 133 are configured to either limit or prevent absorbent pad 120, which is placed against the side 113, from entering the channel system 130'. It is further noted that the channel system 130 of FIG. 16 is also designed to either limit or prevent entry of the pad 120 within the indents of the system 130. The cover 106' of FIG. 17 also includes a top shelf 136 to further prevent the liquid residing on the slide 14 from escaping the slide holder 16.

The slide 14 is releasably secured to the body 100 at a location near the top side 102 to prevent the slide 14 from moving during processing, especially when compressed air is applied to the slide 14. The slide 14 is positioned at an elevation directly below the shelf 112. The slide 14 is releasably secured to the body 100 by (i) a clip 110 formed at the top end of the handle 105, (ii) tabs 111 that extend inwardly from the front end of each side wall 109, and (iii) the shelf 112. The tabs 111 and clip 110 may also be referred to herein as mounting points. Ribs, rails or slots may optionally be disposed on the interior of the sides 109 of the body 100 for additionally securing the slide 14.

A rectangular shaped absorbent pad 120 is mounted to the interior facing side 113 of the rear cover 106 such that the free edge 14a of the slide 14 compresses the pad 120 against the side 113 of the cover 106. The pad 120 bulges outwardly over the shelf 112. The absorbent pad 120 may be composed of any absorbent material known to those skilled in the art. In use, the pad 120 wicks away and absorbs waste liquid that travels downward along the tilted slide 14 toward the rear edge 14a of the slide 14 (either by gravity or by the compressed air stream). The pad 120 prevents residual waste liquid (e.g., reagent or rinse solutions) from remaining on the rear edge 14a of the slide 14 or the bottom side of the slide 14 as a result of surface tension. Such residual waste liquid could inadvertently cause, for example, undesirable dilution of a succeeding liquid stream that is applied to the slide 14.

The slide 14 is a consumable product for one-time use. The slide holder 16 may be a one-time use consumable product that is removably mounted installed onto the slide carriage 62 to eliminate the possibility of cross contamination and for convenience for the end user. Alternatively, the slide holder 16 may be an integral part of the slide carriage 62 that is not disposable or removable from the slide carriage 62.

Turning now to FIGS. 18-21, a sub-assembly comprising the slide 14, an alternative slide holder 16' and an alternative slide carriage 62' is shown. The slide carriage 62' is similar to the above-described slide carriage 62 with the exception that the slide carriage 62' includes a slide heater 140 that is mounted to the top surface of the bottom face of the body 63' of the carriage 62'.

The slide heater 140 comprises a block 141 made of aluminum (or other conductive material), and a heating element 142 that is centrally located within the block 141. The heating element 142 may be a cylindrical heater, a flexible heat pad, a PTC heater, a coiled heating element, a thick or thin film heater, or any other heating device known to those skilled in the art. The slide heater 140 has length and width dimensions that are less than the bottom wall 146 of the slide holder 16' such that the bottom wall 146, upon which waste fluid can collect, surrounds the slide heater 140. The slide heater 140 has a height that is sufficient to directly contact the underside surface of the slide 14 for heating the slide 14 and the sample on the slide 14.

A temperature sensor 143 is mounted to the block 141 for detecting the temperature of the block 141. Wires extending from the heating element 142 and/or the temperature sensor 143 are operatively connected to the computer 23. The computer 23 is configured to activate the heating element 142 to a pre-determined temperature based upon readings from the sensor 143.

Figure 22:
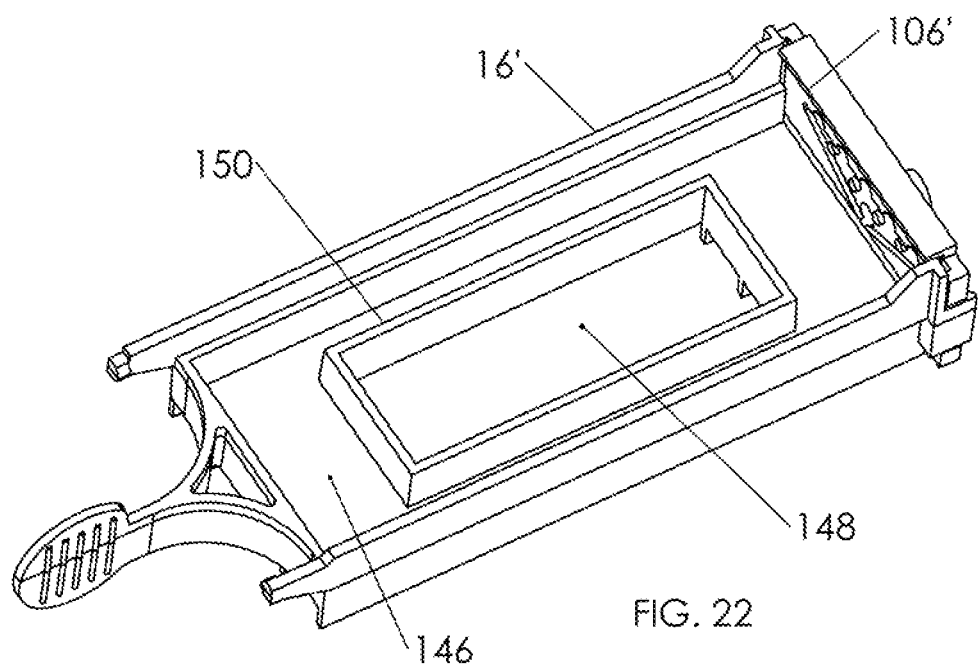
FIG. 22 depicts a top side isometric view of the slide holder of FIGS. 18-21.
Figure 23:
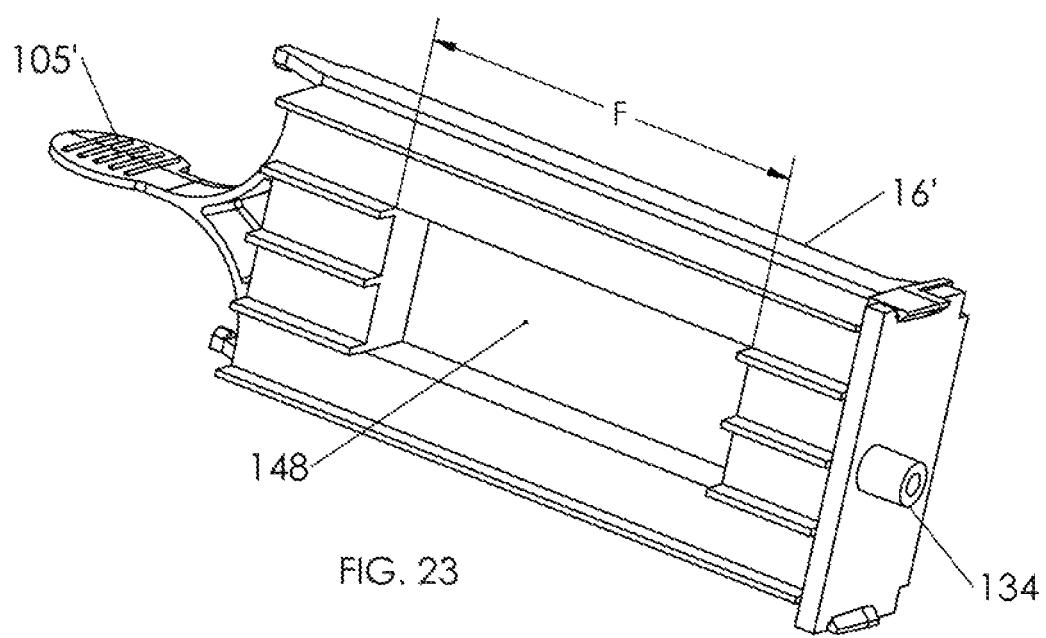
FIG. 23 depicts a bottom side isometric view of the slide holder of FIGS. 18-21.

Turning now to FIGS. 22 and 23, the alternative slide holder 16' is similar to the above-described slide holder 16 with a few exceptions. A rectangular cutout 148 or opening is formed on the bottom wall 146 of the slide holder 16'. The cutout 148 is sized to accommodate the length and width dimensions of the slide heater 140 such that the slide heater 140 can extend up through the cutout 148 to contact the underside of the slide 14. The length dimension 'F' of the cutout 148 is greater than the length dimension of the slide heater 140 such that, once the slide holder 16' is positioned over the slide heater 140, the slide holder 16' can then be translated in a lengthwise direction to connect the port 134 of the slide holder 16' to a matting connector or conduit (not shown).

To mate the slide holder 16' to the slide carriage 62', the slide holder 16' is moved in a lateral direction until the cutout 148 is aligned with and is positioned over the slide heater 140. The cutout 148 of the slide holder 16' is then lowered over the slide heater 140 until the slide heater 140 contacts the underside of the slide 14. The slide holder 16' is then translated forwardly in a lengthwise direction to connect the port 134 of the slide holder 16' to a matting connector or conduit (not shown).

A series of four walls 150 extend upwardly from the bottom wall 146 and extend about the perimeter of the cutout 148. The walls 150 extend to an elevation beneath the slide 14 and without contacting the slide 14 so as to ensure that the slide heater 140 contacts the underside of the slide 14. The walls 150 are configured to prevent any fluid residing on the bottom wall 146 from contacting the slide heater 140 or the sensor 143. It should be understood that the rectangular geometry of the walls 150 and the cutout 148 can vary depending upon the geometry and shape of the slide heater 140. It should also be understood that the walls 150 may be replaced by an elastomeric seal, for example.

The geometry of the circular handle 105' that extends in the lengthwise direction from the body of the slide holder 16' differs slightly from that of the handle 105 described above.

Referring now to one exemplary method of using the system 10, the end user or operator first opens the cover 19 and inserts a new cartridge 20 into the cartridge receiving area (i.e., the plate 35) and closes the cover 19. The reader 29 detects and downloads information from the label 27 on the cartridge 20 and forwards that information to the computer 23. The information contains unique processing instructions for the cartridge 20. The computer 23 can alert the end user if the cartridge 20 is expired because the expiration date is printed on the RFID or barcode label 27 of the cartridge 20. The computer 23 can also compare the sample type that is printed on the RFID label 27 of the cartridge 20 against the sample type that is printed on a barcode or RFID label on the slide 14, and alert the user to any mismatch.

It should be understood that if a used cartridge 20 is currently installed in that cartridge receiving area, then the used cartridge must be removed prior to installing the new cartridge. The cartridge 20 is designed such that it can only be installed in a single rotational orientation, as noted above. Alternatively, the system 10 may be configured to automatically identify the rotational position of the cartridge by virtue of the sensor 34, and adjust the rotational position of the cartridge to its starting position using the motor 30.

The user then installs a new slide 14 onto a new slide holder 16, and then inserts the new slide holder 16 (or new slide holder 16') through the receiving slot 15 in the enclosure 18. If a used slide holder 16 is currently installed in the receiving slot 15, then the used slide holder must be removed before the new slide holder is installed. The slide carriage 62, which receives the slide holder 16, is initially oriented at a position whereupon the slide holder 16 would protrude from the slot 15 by a significant degree once the slide holder 16 is inserted into the slot 15.

The end user then enters slide processing instructions via the interface 17. The slide processing instructions may be a simple as instructions to start processing. Alternatively, the slide processing instructions may be any desired protocol for processing the slide 14. For example, the user can specify the location on the slide 14 at which it is desired to distribute the reagent fluid onto the slide (e.g., front, center or rear on the slide). The information may relate to processing times, temperatures, fluid volumes, compressed air streams, waste disposal, etc. As noted above, the label 27 on the cartridge 20 also contains slide processing information. Further details in connection with the processing instructions, including an operation for heating the slide, are disclosed in the '245 Publication.

Once the end user starts the slide processing procedure, the solenoid 50 is actuated by the computer 23 for latching the cover 19 in the closed position, as sensed by the microswitch 56. The solenoid 96 moves the manifold 80 downwards against the slide holder 16. The position of the slide 14 may be adjusted by actuating the linear actuator 60 to align a desired portion of the slide with the active exit port 24 of the cartridge 20. The computer 23 then actuates the motor 40 to drive the piston carriage 38 downward. The pistons 36a-36c will dispense the fluid from either one or two wells 22, as described above depending upon whether the cartridge 20 is rotationally positioned in either a single dispense configuration or a dual dispense configuration. Reagent fluid will be delivered through the active exit port 24, which is associated with the well(s) 22 that are actuated by the pistons 36a-36c, and onto the slide 14. Depending upon the processing protocol, the computer 23 may actuate the linear actuator 60 to translate the slide 14 so that reagent solution is delivered at multiple locations on the slide 14. The slide 14 may be moved at the same time that the reagent solution is expelled onto the slide 14. Alternatively, the reagent and slide movement operations may be sequential.

Figure 18:
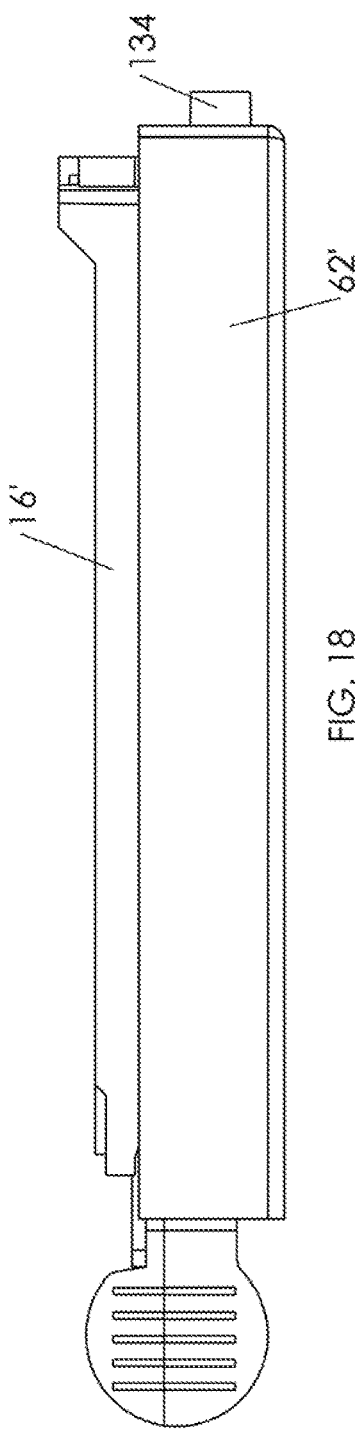
FIG. 18 depicts a side elevation view of a sub-assembly including the slide, an alternative slide holder and an alternative slide cartridge, according to another embodiment of the invention.
Figure 20:
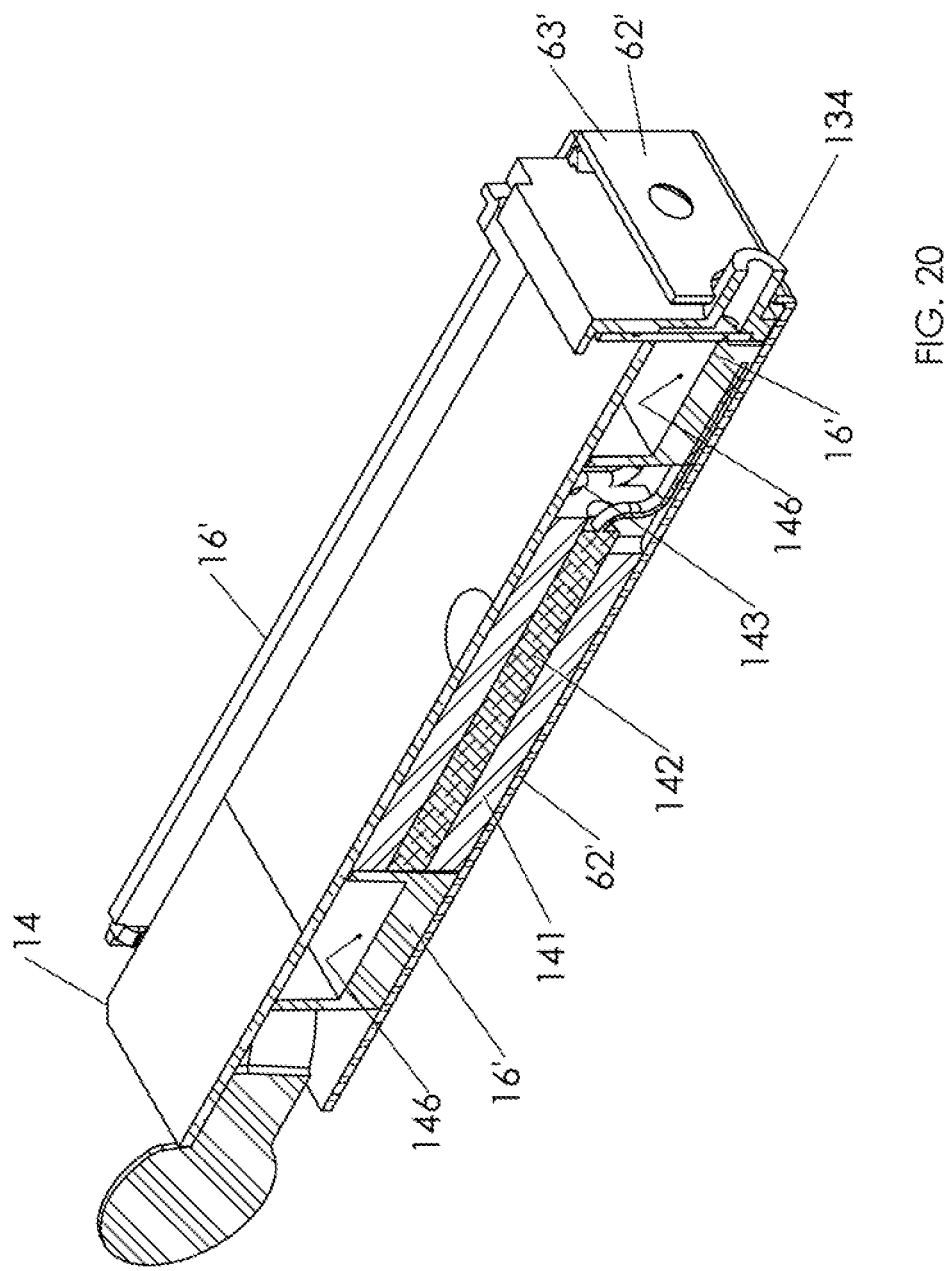
FIG. 20 depicts a cross-sectional view of the sub-assembly of FIG. 19 taken along the lines 20-20.
Figure 21:
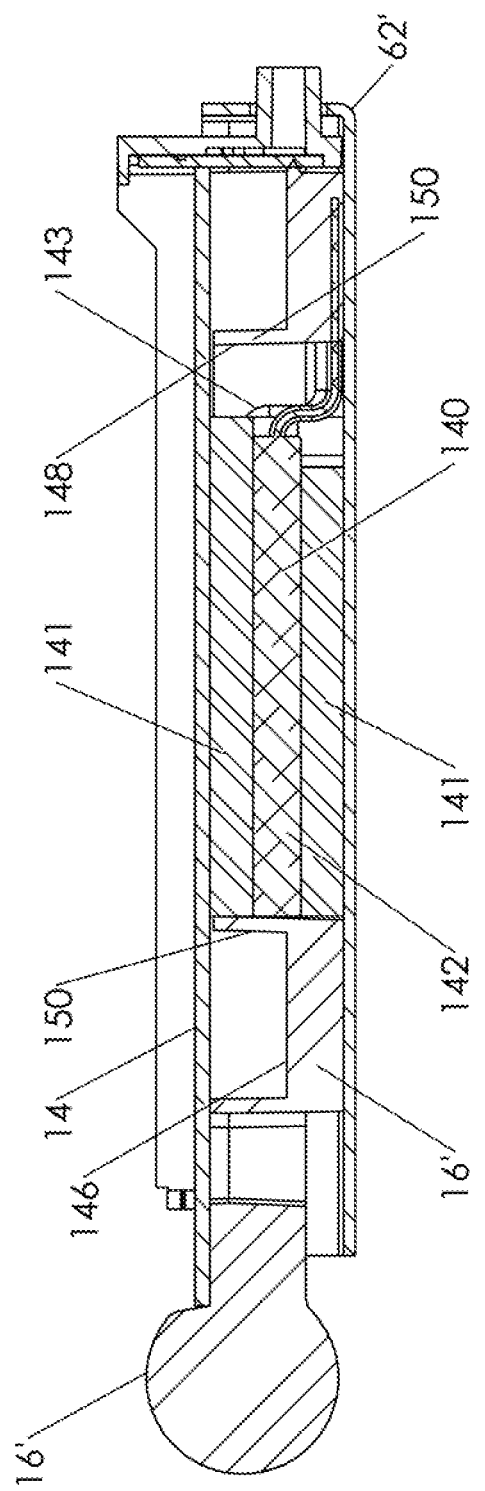
FIG. 21 depicts a cross-sectional view of the sub-assembly of FIG. 19 taken along the lines 21-21.

If the slide holder 16' of FIG. 18 is used with a system 10 including the slide carriage 62', then, at this stage, the computer 23 activates the heating element 142 to heat the slide 14 to a pre-determined temperature, as sensed by the sensor 141, for slide processing purposes. The heating step may be performed either after the reagent is applied to the slide 14 or shortly before the reagent is applied to the slide 14.

After a predetermined time has elapsed, as measured by the computer 23, the computer 23 actuates the rinse solution pump 70. The pump 70 delivers rinse solution (e.g., buffer solution) via the outlets 86 of the manifold 80 onto the slide 14. Depending upon the processing protocol, the computer 23 may actuate the linear actuator 60 to translate the slide 14 so that rinse solution is delivered at multiple locations on the slide 14. The slide 14 may be moved at the same time that the rinse solution is being delivered onto the slide 14. Alternatively, the rinsing and slide movement operations may be sequential.

The reagent and rinse solutions translate downwardly along the length of the slide 14 toward the pad 120. The pad 120 transfers the absorbed waste liquid to channels 130 formed in the rear cover 106. The waste liquid flows downward through the channels 130 toward the outlet 132 formed in the cover 106 and through the connector 134. The computer 23 activates the pump system 73, which is connected to the connector 134 by a conduit (not shown). The pump system 73 draws suction through the connector 134 to draw the waste liquid away from the slide 14.

More particularly, the waste pump system 73 transfers the waste liquid into one of the waste reservoirs 77a and 77b, depending upon whether the waste liquid is hazardous or not. For example, waste reservoir 77a is intended to collect hazardous waste, whereas waste reservoir 77b is intended to collect non-hazardous waste. In operation, the computer 23 activates a peristaltic pump 73a (FIG. 2) of the waste pump system 73 to pump hazardous waste from the waste collection outlet port on the slide carriage 62 to hazardous waste bottle 77a. Alternatively, the computer 23 activates a peristaltic pump 73b of the pump system 73 to pump non-hazardous waste from the waste collection outlet port on the slide carriage 62 to non-hazardous waste bottle 77b. As noted previously, the waste collection outlet port on the slide carriage 62 is fluidly connected to outlet 132 of slide holder 16. The computer 23 determines whether each well 22 of the cartridge 20 contains either hazardous or non-hazardous fluid by virtue of the scanned barcode or RFID label 27 (FIG. 8) on the top surface of the cartridge 20. Separating the reservoirs 77a and 77b between hazardous and nonhazardous waste minimize the volume of waste solution that needs to be disposed of in a special and more expensive manner. Alternatively, a single waste reservoir may be used for collecting all waste solution from the system.

While the pump system 73 is operating, the computer 23 actuates the compressor pump 72. The pump 72 delivers an air stream via the outlets 90 of the manifold 80 onto and over top of the slide 14 to move any residual waste fluid toward the pad 120. Alternatively, the computer 23 may actuate the pump system 73 after the pump 72 delivers compressed air onto the slide 14. Also, depending upon the processing protocol, the computer 23 may actuate the linear actuator 60 to translate the slide 14 so that air is delivered at multiple locations on the slide 14. The slide 14 may be moved at the same time that the compressed air is being delivered onto the slide 14. Alternatively, the air spray and slide movement operations may be sequential.

Now that the waste fluids have been removed from the slide 14, the computer 23 then actuates the motor 40 to drive the piston carriage 38 upward until the pistons 36a-36c are sufficiently above and separated from the wells 22, as determined by sensor 44. The computer then actuates the motor 30 to rotate the cartridge 20 until the next exit port 24 on the bottom of the cartridge 20 is aligned with the slide 14. Rotation of the cartridge 20 is monitored by sensor 34. Thereafter, the computer 23 actuates the motor 40 to drive the piston carriage 38 downward to expel reagent fluid from one or two wells 22 onto the slide 14. Thereafter, the above-described rinsing, air stream and waste discharge steps are repeated. This entire process is repeated until the piston carriage 38 has emptied every well 22 of the cartridge 20 (unless otherwise dictated by the processing protocol.) At the end of the process, the computer 23 activates the solenoid 96 to move the manifold 80 away from the slide holder 16. The computer 23 then activates the actuator 60 to move the slide carriage 62 and the slide holder 16 to a position where the slide holder 16 protrudes from the slot 15 by a significant degree thereby making the slide holder 16 more accessible to the end user. The slide holder 16 (along with the slide 14) is then removed from the slot 15, and the cartridge 20 is removed from the cartridge receiving area.

It is to be understood that the operational steps are performed by the computer 23, a processor of the computer 23, and/or a controller of the computer 23 upon loading and executing software code or instructions which are tangibly stored on a tangible computer readable medium, such as on a magnetic medium, RFID label, barcode label, e.g., a computer hard drive, an optical medium, e.g., an optical disc, solid-state memory, e.g., flash memory, or other storage media known in the art. Thus, any of the functionality performed by the computer 23 described herein is implemented in software code or instructions which are tangibly stored on a tangible computer readable medium. Upon loading and executing such software code or instructions by the computer 23, the computer 23 may perform any of the functionality of the computer 23 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While exemplary embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A tissue processing system for processing a laboratory slide, said system comprising:
   an enclosure comprising interconnected structural members;
   a slide carriage mounted to one of the interconnected structural members for receiving the laboratory slide;
   a cartridge that is positioned at an elevation above the laboratory slide, wherein the cartridge comprises discrete wells that are each filled with reagent fluid, each discrete well having an exit port through which fluid is distributed directly onto the laboratory slide, wherein each exit port is positioned at an elevation directly above the laboratory slide;
   a manifold that is fixedly mounted to one of the interconnected structural members and positioned at an elevation directly above the laboratory slide, wherein the manifold comprises a first fluid passageway including an inlet port and a plurality of outlet ports that are fluidly connected to the inlet port by internal passages and positioned to direct a fluid stream onto the laboratory slide, wherein the outlet ports are fluidly isolated and fluidly disconnected from the exit port of each discrete well of the cartridge, and wherein the outlet ports are stationary and do not move with respect to the enclosure; and
   means for moving the slide carriage relative to the outlet ports and the exit port to adjust a point on the laboratory slide at which fluid is delivered onto the laboratory slide by either the manifold or the cartridge.

2. The tissue processing system of claim 1, wherein the laboratory slide is oriented at an angle with respect to a horizontal plane such that the fluid stream flows down along the laboratory slide by gravity.

3. The tissue processing system of claim 1, wherein the means for moving is a linear actuator or motor that is configured to translate the slide carriage with respect to the outlet ports, which are stationary.

4. The tissue processing system of claim 1, wherein the manifold comprises a second fluid passageway for distributing a different fluid stream onto the laboratory slide, wherein the first and second fluid passageways are fluidly disconnected from each other.

5. The tissue processing system of claim 1, wherein the slide is mounted in a slide holder, and the slide holder is removably mounted to the slide carriage, and the slide holder comprises an absorbent pad that is positionable against an edge of the laboratory slide and is configured to absorb waste fluid travelling along a surface of the laboratory slide.

6. The tissue processing system of claim 1, wherein the manifold further comprises a second fluid passageway including an inlet port and a plurality of outlet ports that are fluidly connected to the inlet port of the second fluid passageway by passages, wherein the first and second fluid passageways transport two different fluids without mixing the two different fluids together within the manifold.

7. The tissue processing system of claim 1, further comprising a movable piston for selectively and sequentially interacting with each well of the cartridge.

8. The tissue processing system of claim 7, further comprising a motor for moving the cartridge with respect to the laboratory slide to selectively align the wells with the laboratory slide.

9. The tissue processing system of claim 1, further comprising means for moving the cartridge with respect to the slide to align the exit port of each individual well of the cartridge with the slide, or vice versa; and
   a reader for reading a cartridge code printed on the cartridge, the cartridge code containing processing instructions for the slide,
   wherein the system is configured to (i) dispense fluid from the exit port of each well of the cartridge based upon the cartridge code printed on the cartridge or (ii) dispense fluid from the manifold based upon the cartridge code printed on the cartridge.

10. The system of claim 9, wherein the system is configured to identify an expiration date in the cartridge code and alert an end user that the cartridge has expired prior to dispensing fluid from the cartridge.

11. The system of claim 9, further comprising another reader for reading a slide code printed on the slide, the slide code containing processing instructions for the slide, wherein the system is configured to identify a procedure type for the slide based on the slide code and identify a procedure type for the cartridge based on the cartridge code, and wherein the system is configured to alert an end user if the procedure types do not match.

12. The tissue processing system of claim 1, wherein the outlet ports of the manifold are positioned at a different elevation than the exit ports of the cartridge.

13. The tissue processing system of claim 1, further comprising one or more pumps connected to the manifold for delivering one or more fluids through the manifold.

14. The tissue processing system of claim 13, wherein the one or more pumps are not configured to deliver fluid through the cartridge.

15. The tissue processing system of claim 13, wherein the manifold comprises a second fluid passageway for distributing a different fluid stream onto the laboratory slide, wherein the first and second fluid passageways are fluidly disconnected from each other, wherein one pump of the one or more pumps is connected to the first fluid passageway and another pump of the one or more pumps is connected to the second fluid passageway.

16. The tissue processing system of claim 1, wherein the cartridge and the manifold are separate components that are not connected together.

17. The tissue processing system of claim 1, wherein the outlet ports of the manifold are not fluidly connected to any of the wells.

18. The tissue processing system of claim 1, wherein the manifold and the cartridge handle different fluid streams.

19. The tissue processing system of claim 6, wherein the outlet ports of the first fluid passageway are position in a first row, and the outlet ports of the second fluid passageway are position in a second row that is spaced apart from the first row on a bottom end of the manifold.

20. The tissue processing system of claim 19, wherein the outlet ports of the first fluid passageway are spaced apart uniformly along the bottom end of the manifold, and wherein the outlet ports of the second fluid passageway are also spaced apart uniformly along the bottom end of the manifold.

21. The tissue processing system of claim 6, further comprising an air pump that is connected to the first fluid passageway, and a rinse solution pump connected to the second fluid passageway.

22. The tissue processing system of claim 19, wherein the outlet ports of the first fluid passageway are fluidly connected with each other in parallel, and the outlet ports of the second fluid passageway are also fluidly connected with each other in parallel.

* * * * *